United States Patent
Suto

(10) Patent No.: US 7,561,286 B2
(45) Date of Patent: Jul. 14, 2009

(54) PRINTING SYSTEM HAVING A FIRST AND A SECOND AUTHENTICATION

(75) Inventor: Hideo Suto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 865 days.

(21) Appl. No.: 10/936,634

(22) Filed: Sep. 9, 2004

(65) Prior Publication Data

US 2006/0050296 A1    Mar. 9, 2006

(51) Int. Cl.
*G06K 15/00* (2006.01)
*G06F 3/12* (2006.01)
(52) U.S. Cl. ............... 358/1.14; 358/1.15; 358/1.13
(58) Field of Classification Search ............ 358/1.14, 358/1.15, 1.13, 1.16, 1.18, 1.1, 1.17, 1.4, 358/1.6, 407, 468, 437; 380/55; 713/166, 713/182, 183, 184; 711/164; 705/18; 708/135, 708/136
See application file for complete search history.

(56) References Cited

U.S. PATENT DOCUMENTS 6,307,640 B1 * 10/2001 Motegi ............... 358/1.14

2005/0275866 A1 * 12/2005 Corlett ............... 358/1.14

FOREIGN PATENT DOCUMENTS

JP    2001-092782    4/2001

* cited by examiner

*Primary Examiner*—Dov Popovici
(74) *Attorney, Agent, or Firm*—Rabin & Berdo, P.C.

(57) ABSTRACT

A printing system includes a host apparatus and a printer. The host apparatus includes the following sections. A user inputs through an inputting section first identification information and a command having either a first function or a second function. An authentication section performs authentication based on the first identification information to generate authentication information indicative of whether the user is an authorized person. The host apparatus and the printer communicate with each other via transmitting and receiving sections. A utility function processinci section runs on the host apparatus and allows activation of the first function of the printer. The printer includes the following sections. An administration section is activated by the controller and runs on the printer, allowing activation of the second function of the Drinter. An identification information decision section determines based on the authentication information whether the command is allowed to be activated.

16 Claims, 26 Drawing Sheets

FIG.8

| COMMAND | ADDRESS INFORMATION | AUTHENTICATION (READ) | AUTHENTICATION (WRITE) | OTHER INFORMATION |
|---|---|---|---|---|
| RESOLUTION CHANGE | /Printer/kaizodo.html | NOT REQUIRED | REQUIRED | ......  |
| ENERGY SAVING ON/OFF | /Printer/energy/energy.html | REQUIRED | | ......  |
| STANDBY TIME BEFORE ENTERING ENERGY SAVING MODE | /Printer/energy/energy.html | | | ......  |
| COLOR DENSITY | /Printer/color/main.html | | | ......  |
| COLOR BALANCE | /Printer/color/balance.htm | | | ......  |

FIG.15

CASE 1
FIRST IDENTIFICATION INFORMATION

| A | B | C | D | E | F | G | H | I | J |

SECOND IDENTIFICATION INFORMATION

| A | B | C | D |

CASE 2
FIRST IDENTIFICATION INFORMATION

| A | B | C | D | E | F | G | H | I | J |

SECOND IDENTIFICATION INFORMATION

|   |   |   |   |   |   | G | H | I | J |

CASE 3
FIRST IDENTIFICATION INFORMATION

| A | B | C | D | E | F | G | H | I | J |

SECOND IDENTIFICATION INFORMATION

|   |   |   | D | E | F | G |

CASE 4
FIRST IDENTIFICATION INFORMATION

| A | B | C | D | E | F | G | H | I | J |

SECOND IDENTIFICATION INFORMATION

| D | C | B | A |

CASE 5
FIRST IDENTIFICATION INFORMATION

| A | B | C | D | E | F | G | H | I | J |

SECOND IDENTIFICATION INFORMATION

|   |   |   |   |   |   | J | I | H | G |

CASE 6
FIRST IDENTIFICATION INFORMATION

| A | B | C | D | E | F | G | H | I | J |

SECOND IDENTIFICATION INFORMATION

|   |   |   | G | F | E | D |

CASE 7
FIRST IDENTIFICATION INFORMATION

| A | B | C | D | E | F | G | H | I | J |

SECOND IDENTIFICATION INFORMATION

|   | B |   |   | E |   | G |   | I |   |

FIG.18

CASE 1
| | | | | | | | | | | |
|---|---|---|---|---|---|---|---|---|---|---|
| FIRST IDENTIFICATION INFORMATION | A | B | C | D | | | | | | |
| SECOND IDENTIFICATION INFORMATION | A | B | C | D | E | F | G | H | I | J |

CASE 2
| | | | | | | | | | | |
|---|---|---|---|---|---|---|---|---|---|---|
| FIRST IDENTIFICATION INFORMATION | | | | | | | G | H | I | J |
| SECOND IDENTIFICATION INFORMATION | A | B | C | D | E | F | G | H | I | J |

CASE 3
| | | | | | | | | | | |
|---|---|---|---|---|---|---|---|---|---|---|
| FIRST IDENTIFICATION INFORMATION | | | | D | E | F | G | | | |
| SECOND IDENTIFICATION INFORMATION | A | B | C | D | E | F | G | H | I | J |

CASE 4
| | | | | | | | | | | |
|---|---|---|---|---|---|---|---|---|---|---|
| FIRST IDENTIFICATION INFORMATION | D | C | B | A | | | | | | |
| SECOND IDENTIFICATION INFORMATION | A | B | C | D | E | F | G | H | I | J |

CASE 5
| | | | | | | | | | | |
|---|---|---|---|---|---|---|---|---|---|---|
| FIRST IDENTIFICATION INFORMATION | | | | | | | J | I | H | G |
| SECOND IDENTIFICATION INFORMATION | A | B | C | D | E | F | G | H | I | J |

CASE 6
| | | | | | | | | | | |
|---|---|---|---|---|---|---|---|---|---|---|
| FIRST IDENTIFICATION INFORMATION | | | | G | F | E | D | | | |
| SECOND IDENTIFICATION INFORMATION | A | B | C | D | E | F | G | H | I | J |

CASE 7
| | | | | | | | | | | |
|---|---|---|---|---|---|---|---|---|---|---|
| FIRST IDENTIFICATION INFORMATION | | B | | | E | | G | | I | |
| SECOND IDENTIFICATION INFORMATION | A | B | C | D | E | F | G | H | I | J |

FIG.26

| PRINTER | IDENTIFIER OF PRINTER | SECOND IDENTIFICATION INFORMATION | OTHER INFORMATION |
|---|---|---|---|
| printer001 | aa.bb.cc.dd | name=XXXX pass=YYYY | ------ |
| FAX001 | aa.bb.ee.tt | name=AAAA pass=WWWW | |
| mfp001 | aa.vv.ee.oo | name=BBBB pass=ZZZZ | ------ |
| printer002 | qq.rr.gg.jj | name=CCCC pass=PPPP | ------ |
| printer003 | pp.aa.ee.cc | name=NNNN pass=SSSS | ------ |
| mfp002 | hh.ww.aa.cc | name=KKKK pass=EEEE | ------ |

US 7,561,286 B2

PRINTING SYSTEM HAVING A FIRST AND A SECOND AUTHENTICATION

BACKGROUND OF THE INVENTION

1. Field of the Invention

The present invention relates to a printing system and the configuration for setting the options of the printing system.

2. Description of the Related Art

When options for a printer such as a network card are set, it is quite common that exclusive tools supplied together with the printer are used. Such exclusive tools are as follows:

(1) Utilities designed for individual operating systems (2) WEB page residing in the printer The utilities for individual operating systems are designed in accordance with the features and functions of the operating systems. Therefore, they usually provide the high degree of user-friendliness. For example, the utility continues to be displayed in a minimum space on a screen and is in a standby state, thereby allowing the user to monitor the status of the printer. In addition, when trouble occurs within the printer, a dialogue box can be displayed automatically.

The WEB page installed in a printer is displayed on a WEB browser and can operate on the WEB browser. Therefore, a single WEB page can perform its functions on almost any operating systems. However, functions that the browser does not have can not be implemented, so that the WEB page as a tool for setting options has less user-friendliness than individual utilities provided on corresponding operating systems.

In recent years, printers have been used in a wide variety of environments and the printers and their options are increasingly expanding. The same is true for the aforementioned two tools. From a standpoint of expansion of functions, expanding utilities involves tremendous development costs since each operating system requires its own utility expansion. On the other hand, a single WEB page installed in a printer can operate on different operating systems and therefore requires less development cost. To make full use of the features of the aforementioned two tools, it has been considered that expansion of the utilities of individual operating systems should be minimized and further expansion should be achieved by a WEB page installed in the printer.

Such a tool may be used when the printer is to perform operations different from the standard operations in a specific situation.

However, the tools of the aforementioned configuration suffer from the following problems. It is desirable that installment of options and modification to the settings of options are performed by an authorized person only. In other words, from a standpoint of security, it is not preferable that all the persons who have access to the printer are allowed to modify the settings of the options. For this purpose, the aforementioned two types of tools are designed to request an operator to input identification information such as a password indicating that the operator is an authorized person.

With the configuration in which a WEB page installed in a printer is activated to perform functions not available in the utilities in individual operating systems, both the utility and the WEB page require identification information for identifying an authorized person. This implies that when the authorized person installs options and/or modifies settings, he must input the identification information (e.g., password) many times.

SUMMARY OF THE INVENTION

The present invention was made to solve the aforementioned problems.

An object of the invention is to provide a printing system in which when an authorized person installs a printer and modifies the settings of the options, he need not to input identification information (e.g., password) many times.

A printing system having a host apparatus and a printer connected to the host apparatus, wherein the host apparatus comprises:

an inputting section through which a user inputs first identification;

a first authentication section that performs a first authentication operation based on the first identification information inputted by the user, the first authentication operation being performed for a first function section that performs a first function;

a first transmitting and receiving section through which the host apparatus transmits information based on the first identification information to the printer;

wherein the printer comprises;

a second transmitting and receiving section through which the printer communicates with said first transmitting and receiving section;

a second authentication section that performs a second authentication operation on the basis of the information based on the first identification information received via said second transmitting and receiving section.

A printing system having a host apparatus and a printer connected to the host apparatus, wherein the host apparatus includes:

an inputting section through which a user inputs first identification information and a command having either a first function or a second function;

an authentication section that performs an authentication operation based on the first identification information inputted by the user to generate authentication information indicative of whether the user is an authorized person;

a first transmitting and receiving section through which the host apparatus communicates with the printer;

first setting means that runs on the host apparatus and allows activation of the first function of the printer via the first transmitting and receiving section; and a controller;

wherein the printer includes:

a second transmitting and receiving section through which the printer communicates with the host apparatus; that enables communication between the printer and the host apparatus;

second setting means that is activated by the controller and runs on the printer, the second setting means allowing activation of the second function of the printer via the second transmitting and receiving section; and an identification information decision section that determines based on the authentication information whether the command is allowed to be activated.

When the user inputs the command to activate the second setting means after the authentication operation, the controller sends the second function and the authentication information to the printer via the first transmitting and receiving section;

wherein the identification information decision section determines based on the authentication information whether the command is allowed to be activated;

wherein if the authentication information is valid, the controller activates the second setting means.

When the user inputs the command to activate the second setting means before the authentication operation, the identification information decision section sends a response requesting the host apparatus of second identification information for authenticating the user;

wherein the controller transmits the second identification information to the printer in response to the response;

wherein the identification information decision section determines based on the second identification information received from the controller whether the second function is allowed to be activated;

wherein if the identification information decision section determines that the authentication is valid, the controller activates the second setting means.

A printing system having a host apparatus and a printer connected to the host apparatus, wherein the host apparatus includes:

an inputting section through which a user inputs first identification information and a command including either a first function or a second function;

an authentication section that performs an authentication operation based on the first identification information inputted by the user to generate authentication information indicative of whether the user is an authorized person;

a first transmitting and receiving section through which the host apparatus communicates with the printer;

first setting means that runs on the host apparatus and allows activation of the first function of the printer via the first transmitting and receiving section; and a controller;

wherein the printer includes:

a second transmitting and receiving section through which the printer communicates with the host apparatus;

second setting means that is activated by the controller and runs on the printer, the first setting means allowing activation of the second function of the printer via the second transmitting and receiving section; and an identification information decision section that compares the first identification information received from the host apparatus via the first transmitting and receiving section with the second identification information held in the printer to determine whether the command is allowed to be activated.

When the user inputs the command to activate the second setting means after the authentication operation, the controller sends the second function and the authentication information to the printer via the first transmitting and receiving section;

wherein the identification information decision section determines based on the authentication information whether the command is allowed to be activated;

wherein if the authentication information is valid, the controller activates the second setting means.

When the user inputs the command to activate the second setting means before the authentication operation, the identification information decision section sends a response requesting the host apparatus of second identification information for authenticating the user;

wherein the controller transmits the second identification information to the printer (310) in response to the response;

wherein the identification information decision section determines based on the second identification information received from the controller whether the second function is allowed to be activated;

wherein if the identification information decision section determines that the authentication is valid, the controller activates the second setting means.

The printer further comprises an identification information data base that holds the pre-registered second identification information;

wherein if the identification information decision section determines that the first identification information received from the host apparatus is the same as the second identification information read from the identification data base, the controller activates the second setting means.

The printer further comprises an identification information data base that holds the pre-registered second identification information;

wherein if the identification information decision section determines that the first identification information contains the second identification information, the controller activates the second setting means.

The printer further comprises an identification information data base that holds the pre-registered second identification information;

wherein if the identification information decision section determines that the first identification information is contained in the second identification information, the controller activates the second setting means.

A printing system having a host apparatus and a printer connected to the host apparatus, wherein the host apparatus includes:

an inputting section through which a user inputs first identification information and a command including either a first function or a second function;

an authentication section that performs an authentication operation based on the first identification information inputted by the user to generate authentication information indicative of whether the user is an authorized person;

a first transmitting and receiving section through which the host apparatus communicates with the printer;

first setting means that runs on the host apparatus and allows activation and reference of the first function of the printer via the first transmitting and receiving section; and a controller that transmits the first identification information and the command to the printer via the first transmitting and receiving section;

wherein the printer includes:

a second transmitting and receiving section through which the printer communicates with the host apparatus;

second setting means that is activated by the controller and runs on the printer, the first setting means allowing activation of the second function of the printer via the second transmitting and receiving section; and an identification information data base that holds the pre-registered first identification information indicative of an authorized person;

an identification information decision section that compares the first identification information received from the host apparatus with the first identification information read from the identification information data base to determine whether the command is allowed to be activated.

When the identification information decision section determines that the first identification information received from the host apparatus coincides the first identification information read from the identification information data base, the controller activates the second setting means.

A printing system having a host apparatus and a printer connected to the host apparatus, wherein the host apparatus includes:

an inputting section through which a user inputs first identification information and a command including either a first function or a second function;

an authentication section that performs an authentication operation based on the first identification information inputted by the user to generate authentication information indicative of whether the user is an authorized person;

a first transmitting and receiving section through which the host apparatus communicates with the printer;

first setting means that runs on the host apparatus and allows activation and reference of the first function of the printer via the first transmitting and receiving section; and a data base that holds the pre-registered second identification information;

a controller;

Wherein the printer includes:

a second transmitting and receiving section through which the printer communicates with the host apparatus;

an identification information data base that holds the pre-registered second identification information indicative of an authorized person;

an identification information decision section that compares the second identification information received from the host apparatus with the second identification information read from the identification information data base to determine whether the command is allowed to be activated;

second setting means that is activated by the controller and runs on the printer, the second setting means allowing activation of the second function of the printer via the first transmitting and receiving section and the second transmitting and receiving section.

The host apparatus further comprises an identification information data base that holds the pre-registered second identification information;

wherein when the user inputs a command to activate the second function after the authentication operation, the controller sends the second identification information held in the identification information data base;

wherein the identification information decision section determines based on the second identification information whether the second function is allowed to be activated;

wherein if the second identification information is valid, the controller activates the second setting means.

When the user inputs a command to activate the second function before the authentication operation, the identification information decision section sends a response requesting the host apparatus of the second identification information for authenticating the user;

wherein the controller transmits the second identification information to the printer in response to the response;

wherein the identification information decision section determines based on the second identification information received from the controller whether the second function is allowed to be activated;

wherein if the identification information decision section determines that the second identification information is valid, the controller activates the second setting means.

The printer further includes an identification information data base that holds a pre-registered second identification information indicative of an authorized person;

wherein if the command contains the second function, the identification information decision section determines that the authentication information is invalid, and then requests via the second transmitting and receiving section the host apparatus of the second identification information for authenticating the user;

wherein when the second identification information is received from the host apparatus, the identification information decision section compares the pre-registered identification information with the second identification information received from the host apparatus to determine whether the command is allowed to be executed;

wherein if the pre-registered identification information is the same as the second identification information received from the host apparatus, the controller activates the second setting means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 8 is a table stored in a tool activation section;

FIG. 15 illustrates examples in which a character train of first identification information contains a pattern of second identification information;

FIG. 18 illustrates examples in which a train of characters of second identification information contains a pattern of the first identification information;

FIG. 26 illustrates the configuration of a first-and-second identification information data base.

DETAILED DESCRIPTION OF THE INVENTION

Terms in the specification are defined as follows:

WEB page is a sort of program that is described in a description language such as HTML, XHTML, and XM. This program runs on software called a WEB browser. A WEB page not only provides graphical displays primarily on a WEB browser but also operates just like programs on computers, allowing access to files and implementing network communications.

MIB is a data base that allows information exchange in a text format called asn.1. In order to access individual items on MIB, a protocol called SNMP is used to specify an identifier called Object ID that is assigned to individual items. The instant specification does not deal with MIB in detail.

In the present invention, first identification information refers to, for example, a password that a utility of the host apparatus requests for authenticating a user. Second identification information refers to, for example, a password that a printer requests for authenticating a user.

The identification information in the first embodiment includes identification information of a network administrator, first identification information, and second identification information, and takes the form of a user ID, an account name, a password, finger mark data, a face contour, a voice print, and other data that can identify individuals.

The present invention provides the user with a setting function performed via utilities on a host apparatus and a setting function performed via a WEB page resident in a printer.

Figure 3:
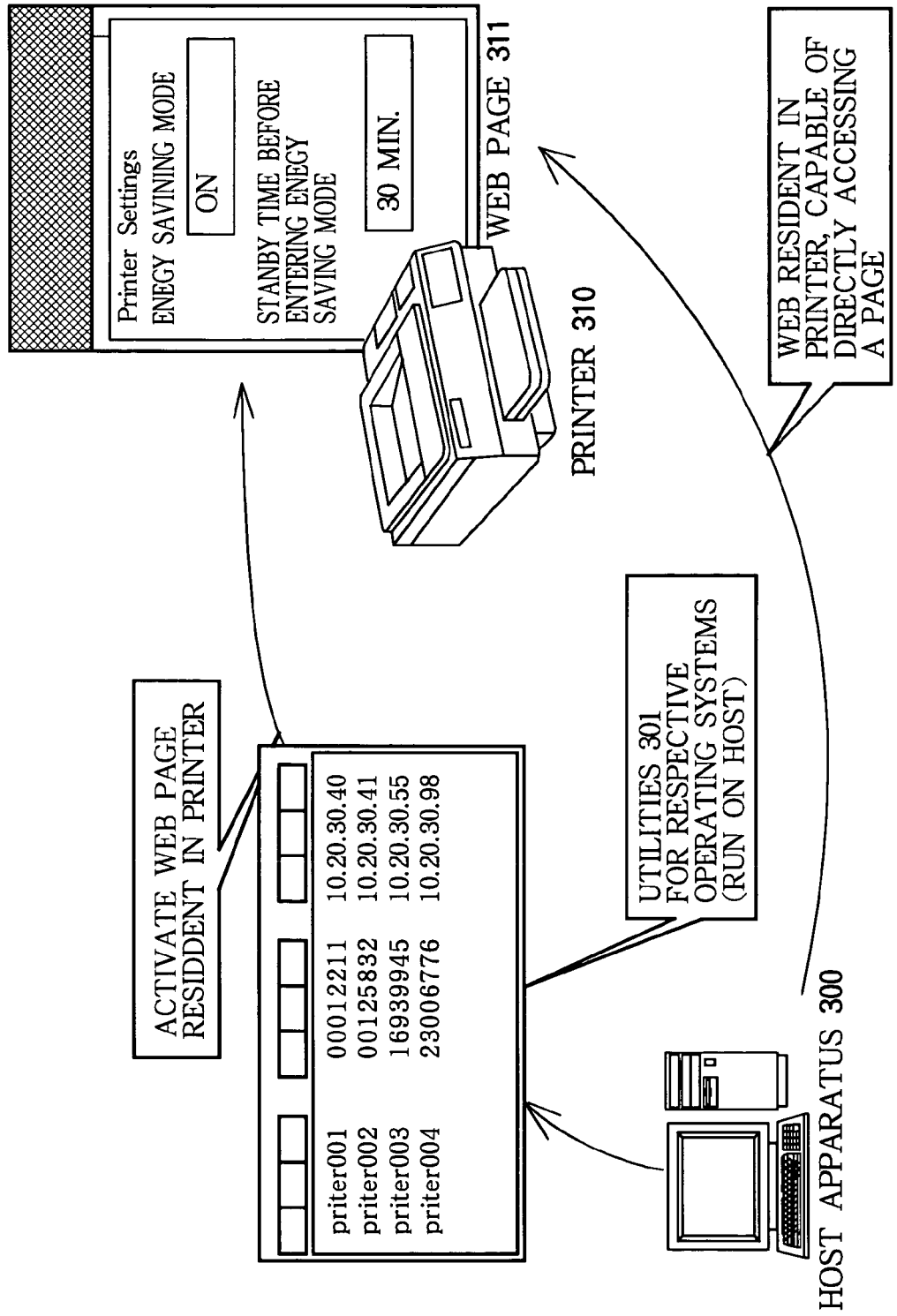
FIG. 3 illustrates a general configuration of the first embodiment.

FIG. 3 illustrates a general configuration of the first embodiment. The general configuration of the first embodiment will be described with reference to FIG. 3.

A host apparatus 300 activates utilities 301 provided therein for corresponding operating systems, the utilities serving as a means for setting a printer 310 and the options of the printer 310. However, the utilities 301 provided for the corresponding operating systems may not necessarily be capable of managing all the settings of the printer and its options. In fact, some or all of the settings may be relied on other sub-utilities.

In the present invention, a WEB page 311 installed in the printer 310 will be described as an example of the sub-utilities. Just as in common WEB pages, the WEB page 311 is described in a description language such as HTML, and has functions that allow referencing to and modifying of the settings of the printer 310 and its the options.

Since the printer 310 has the WEB page 311 installed therein, the user is allowed to activate a WEB browser 115 directly from the host apparatus 300. The user can specify the address of the WEB page 311 so that the WEB page 311 is displayed on the host apparatus 300.

First Embodiment

Figure 1:
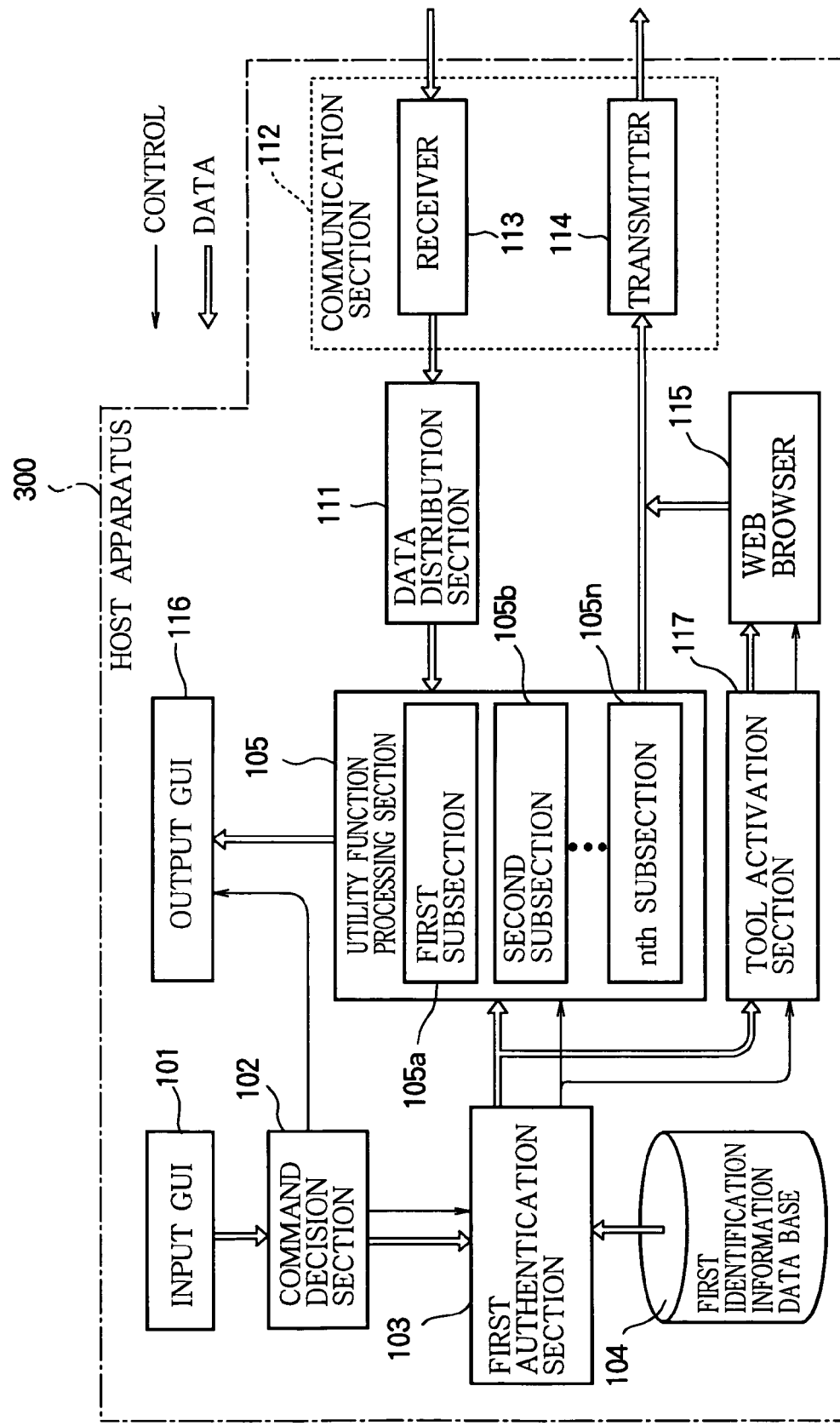
FIG. 1 is a block diagram of a host apparatus according to a first embodiment.

A first embodiment will be described with reference to FIGS. 1 and 2. FIG. 1 is a block diagram of the host apparatus 300. An input GUI 101 receives information inputted by a user. The input information includes a request (referred to as a command hereinafter) from the user and identification information of the user. The identification information of a user is information that identifies the user and takes the form of, for example, a password. The identification information of a user used in the host apparatus 300 is "first identification information."

A command decision section 102 receives the information inputted by the user through the input GUI 101 and reads a command to the host apparatus 300 from the information. The command decision section 102 then selects an appropriate subsection corresponding to the command from subsections in a utility function processing section 105. Some commands require authentication. If such a command is received, then the command decision section 102 requests through an output GUI section 116 the user to input identification information, i.e., first identification information that can identify the user. When the user inputs the first identification information, the input GUI 101 transfers the first identification information to the command decision section 102.

If the information inputted by the user through the input GUI 101 contains the first identification information that identifies the user, the command decision section 102 will not request through the output GUI section 116 the user to input identification information that identifies the user. The command decision section 102 sends a command read from the received information, a subsection corresponding to the command, and the first identification information to a first authentication section 103. The first authentication section 103 compares the pre-registered first identification information received from the command decision section 102 with the first identification information read from a first identification information data base 104 to produce first authentication information. This operation is called first authentication.

The first identification information data base 104 is a data base that holds the pre-registered first identification information. If the two items of first identification information coincide, the first authentication section 103 sends the command received from the command decision section 102 and the comparison result to the corresponding subsection in the utility function processing section 105. If the WEB browser 115 is to be activated, the command decision section 102 specifies a tool activation section 110 that activates a tool in a printer.

The utility function processing section 105 includes n different functions; a first subsection 105a, a second subsection 105b, . . . . and an n-th subsection 105n. The utility function processing section 105 transmits information to the printer via a transmitter 114 and receives information from the printer 310 via a receiver 113 and a data distribution section 111.

The WEB browser 115 is a common WEB browser that may be activated when the tool activation section 110 communicates with an external apparatus. The WEB browser 115 reads a WEB page in accordance with an address supplied from the tool activation section 110.

A communication section 112 is a communication processing section through which the respective sections in the host apparatus 300 communicate with external apparatus connected to the host apparatus. In the first embodiment, the communication section 112 takes the form of a network interface. The respective sections in the host apparatus 300 receive information through the receiver 113 from external apparatus. The respective sections in the host apparatus 300 send information through the transmitter 114 to external apparatus.

The tool activation section 110 operates to implement functions that the host apparatus 300 has not. By way of example, the first embodiment will be described in terms of an operation that activates a WEB page 311 installed in the printer 310.

The tool activation section 110 sends an address indicative of a specific WEB page installed in the printer 310 and the first authentication information received from the first authentication section 103 to the WEB browser 115, thereby activating the WEB browser 115.

During the communication with the printer 310 to activate a function in the utility function processing section 105, the data distribution section 111 checks the content of the data received from the printer 310 and directs the data to a corresponding subsection in the utility function processing section 105.

The output GUI section 116 of the host apparatus 300 indicates information to the user as well as requests the user to input the first identification information.

Figure 2:
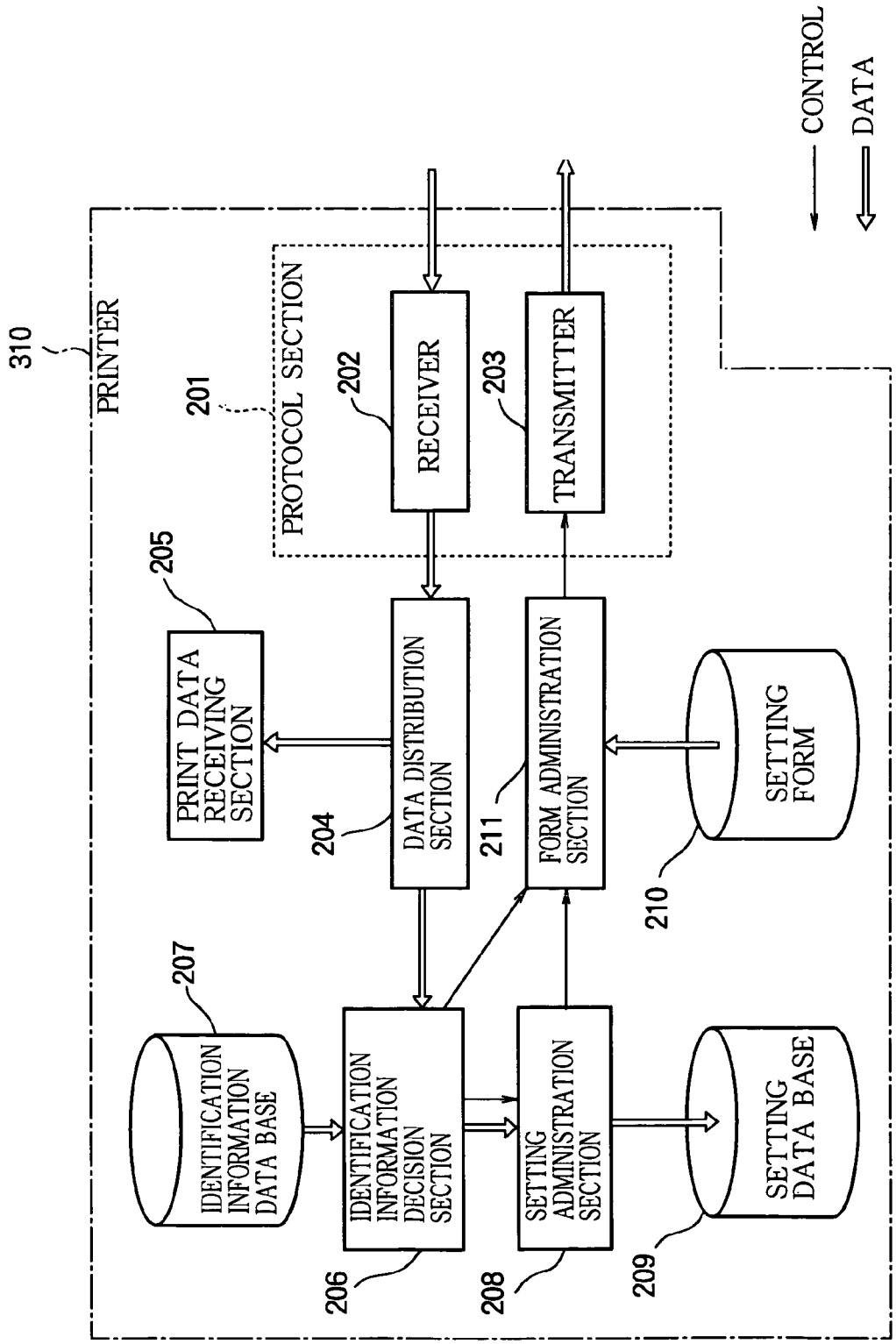
FIG. 2 is a block diagram of a printer according to the first embodiment.

FIG. 2 is a block diagram of the printer 310 according to the first embodiment. A protocol section 201 is a communication interface for the printer 310 through which the printer 310 communicates with the network and external apparatus. The protocol section 201 takes the form of a network interface. The protocol section 201 includes a receiver 202 and a transmitter 203. The receiver 202 is an interface that receives information from external apparatus connected to the printer 310. The transmitter 203 is an interface that transmits information to the external apparatus connected to the printer 310.

A data distribution section 204 determines whether the information received in the printer 310 is print data or data for referencing to and/or changing settings (including referencing to status). Then, the data distribution section 204 separates the received information into the print data and the data for referencing to and/or changing settings (including reference to status).

If the received information is print data, then the data distribution section 204 directs the received information to a print data receiving section 205. If the received information is data for referencing to and modifying the settings in the printer 310, then the data distribution section 204 directs the received information to an identification information decision section 206. The data distribution section 204 also notifies the identification information decision section 206 of a means that received the information or at least information indicative of which means received the information.

The means that receive the information include WEB (protocol is HTTP), MIB (protocol is SNMP), and E-Mail (protocol is SMTP). When a response is to be transmitted to the host apparatus 300, it is required to send the response over the same means that received the information from the host apparatus 300. Because the first embodiment is described with respect to the WEB, the description of the other means will be omitted.

The print data receiving section 205 is an interface that receives a print job from the host apparatus 300. After having been received in the print data receiving section 205, the print data will be subjected to analysis of print data, edition of print data, expansion of print data into bit map data, and engine processing for actually fixing an image on print paper. However, the respective data processings will not be described in this specification.

A setting data base 209 holds the settings of the printer 310 and its options as well as the status of the printer and its options. The identification information decision section 206 determines whether a command was inputted by an authorized person (hereinafter network administrator), the command being supplied from the data distribution section 204 and requesting to reference to and change the settings of the printer or check the status of the printer.

If the received information contains the first authentication information indicative of a network administrator, then the identification information decision section 206 determines whether the first authentication information is valid or invalid. If it is valid, then the identification information decision section 206 notifies a setting-administration section 208 of the command for referencing to or modifying a setting.

If the authentication information is invalid or the received information does not contain the first authentication information, then the identification information decision section 206 determines that the command has not successfully passed the first authentication performed in the first authentication section 103. Then, through a form administration section 211, the identification information decision section 206 requests the host apparatus 300 of second identification information indicative of a network administrator.

The second identification information is used when an authentication function is performed in the printer 310 (referred to as second authentication). The second authentication is activated when the user accesses the WEB page installed in the printer 310 directly from the host apparatus 300.

When the identification information decision section 206 notifies the setting administration section 208 and form administration section section 211, the identification information decision section 206 also notifies these sections of a means that received the information or at least information indicative of which means received the information.

If the first authentication information indicates "VALID," the identification information decision section 206 determines that the received first authentication information is valid. If the first authentication information indicates "INVALID," the identification information decision section 206 determines that the received first authentication information is invalid. An identification information database 207 holds pre-registered second identification information.

The setting-administration section 208 administrates the settings and the status of the printer 310 and the options of the printer 310, the settings and the status being stored in the setting data base 209. The setting-administration section 208 executes the command for referencing to and modifying the settings and status, the command being received from the identification information decision section 206. Then, the setting administration section 208 notifies the form administration section 211 of the results of execution of the command. At this moment, the setting-administration section 208 also notifies a means that received the information (command) or at least information indicative of which means received the information.

In accordance with the information supplied from the setting-administration section 208, i.e., the information on a means that received the information or at least information indicative of which means received the information, the form administration section 211 selects a means via which a response is to be sent to the host apparatus 300. According to the first embodiment, this means is a WEB page.

In accordance with the command received from the identification information decision section 206, the form administration section 211 reads the WEB page 311 from a setting form 210, the WEB page 311 prompting the use to input the second identification information. Then, the form administration section 211 sends the WEB page 311 to the host apparatus 300 via the transmitter 203. The setting form 210 is a data base that stores a WEB page required for setting the printer 310 and the options of the printer 310.

In accordance with the command received from the setting administration section 208, the form administration section 211 also reads the WEB page 311 from a setting form 210, the WEB page 311 displaying the settings and status of the printer 310. Then, the form administration section 211 sends the WEB page 311 to the host apparatus 300 via the transmitter 203.

The outline of the first embodiment will be described with reference to FIG. 3. In order that the user can use the utilities 301 on the host apparatus 300, it is necessary to first perform authentication (referred to as first authentication) of the user. Thereafter, If the user activates a function that is not resident in the utilities 301 but displayed on the screen of the host apparatus, the host apparatus 300 reads the WEB page 311 of the printer 310 having a function activated by the user.

In the first embodiment, the host apparatus 300 notifies the printer 310 of the first authentication information. Thus, the printer 310 implements the command without activating an authentication function installed in the printer 310, i.e., second authentication, thereby allowing the host apparatus 300 to read the WEB page 311.

Figure 4:
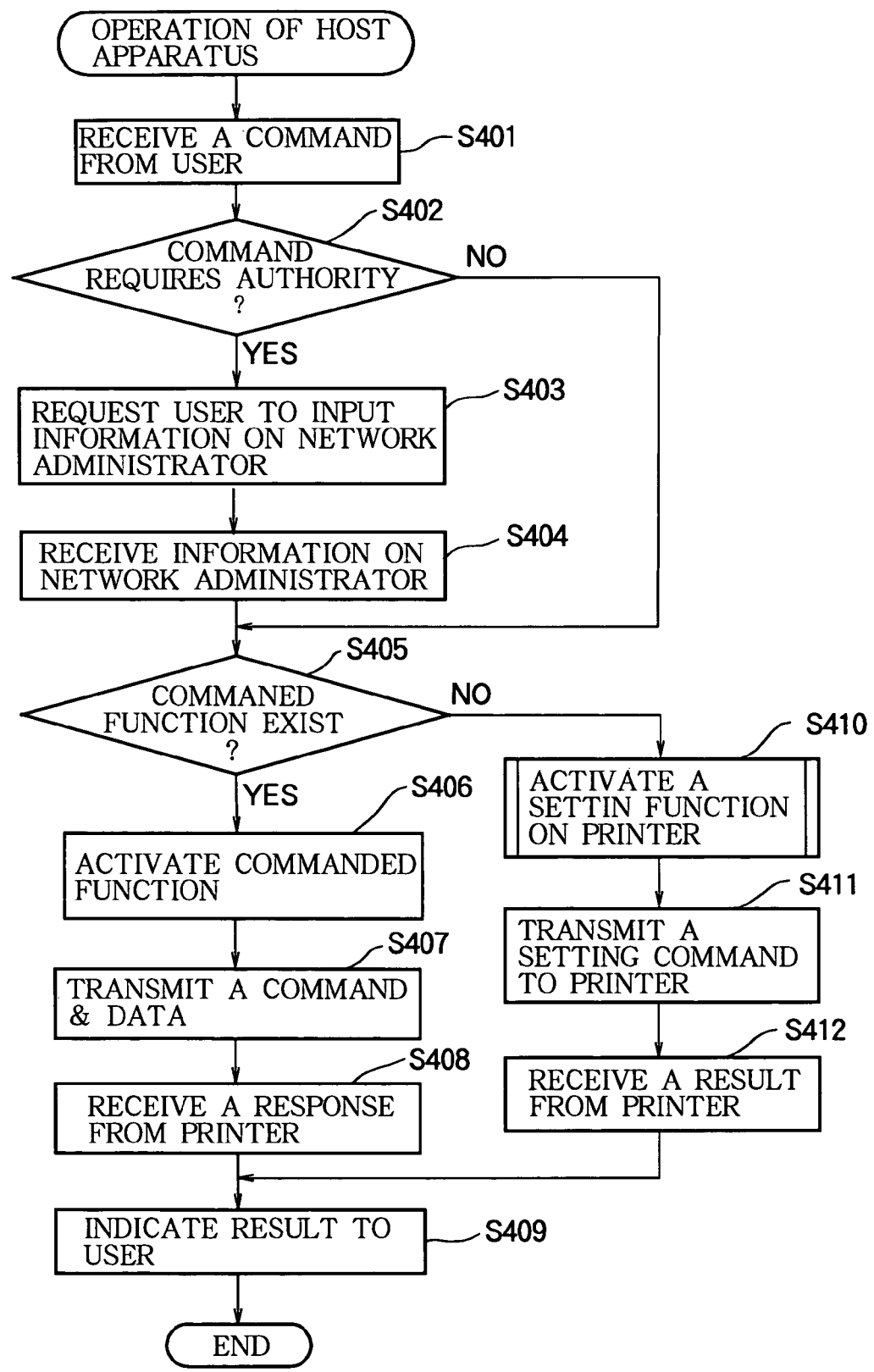
FIG. 4 is a flowchart illustrating the operation of the host apparatus.

FIG. 4 is a flowchart illustrating the operation of the host apparatus 300.

The operation of the host apparatus 300 will be described with reference to FIG. 4.

S401: The host apparatus 300 receives a command from a user of the utilities 301. The user can input various commands by using a mouse to click the button of a desired utility 301 (FIG. 3) or select an appropriate one from a pull-down menu. The command is received via the input GUI section 101 and then transferred to the command decision section 102.

S402: The command decision section 102 checks the command received at S401 from the user to determine whether the command may be made only by an authorized network administrator or by any user. Commands that require authorization and commands that do not require authorization have been registered in advance. If a command needs to be attended by authentication, the program proceeds to S403. If the command need not be attended by authentication, the program proceeds to S405.

S403: The utility 301 resident in the host apparatus 300 requests the user to input the pre-registered identification information indicative of a network administrator (first identification information). An input screen will appear through which the user inputs, for example, a password.

S404: When the user inputs, for example, a password, the utility 301 accepts the password as the first identification information.

S405: When the first authentication for the command received has completed, a decision is made to determine whether the function commanded by the user exists in the utilities 301. If the function commanded by the user exists in the utilities 301, then the program proceeds to S406; if not, the program proceeds to S410.

Here, the term "first setting means" is used to refer to a function that is resident in the utilities 301 in the host apparatus 300 and allows referencing and changing of the settings of the printer 310 and its options or checking the status of the printer 310 and its options.

The term "second setting means" is used to refer to a function, not resident in the host apparatus 300, in which the WEB page 311 allows referencing and changing of the settings of the printer 310 and its options or checking the status of the printer and its options.

The system may be configured in such a way that the first setting means (utilities 301) has only a function that references to the settings in the printer 310, and the second setting means takes care of changing of the settings via the WEB browser 115.

S406: In order to implement a function commanded by the user, a corresponding subsection (the second subsection 105b is assumed here) in the utility function subsection 105 is activated. Assume that the user requests to switch a standby time from "30 minutes" to "5 minutes", the standby time being a time length that should be allowed before the printer enters an energy saving mode after the printer has completed a printing job. The command decision section 102 knows which one of the subsections (assume the second subsection 105b here) is assigned a function for changing the standby time. Thus, the command decision section 102 specifies the second subsection 105b.

S407: The second subsection 105b knows which identifier is assigned to the standby time. Thus, the second subsection 105b sends an identifier indicative of the standby time and a time length of "5 minutes" to the printer 310 via the transmitter 114. Identifier is used to uniquely identify a corresponding item of data. For example, if MIB is to be used, the identifier is Object ID.

S408: The host apparatus 300 receives a response from the printer 310. The response indicates whether a standby time of "5 minutes" has been set successfully. The received-data decision section 111 directs the response from the printer 310, received via the receiver 113, to a section that originally sent the command. In this case, the command was originally sent from the second subsection 105b. Thus, the received-data decision section 111 directs the response received from the printer 310 to the second subsection 105b.

S409: The response is indicated to the user via the output GUI section 116.

S410: If it is determined that the function commanded by the user at S405 is not resident in the utilities 301, then the tool activation section 110 causes the WEB browser 115 to call the WEB page 311 from the printer 310. This step will be described later in detail (FIG. 5).

S411: The WEB page 311 called runs on the WEB browser 115 in the host apparatus 300 and sets the standby time of "5 minutes" into the printer 310. This operation of setting the standby time is carried out by the use of PUT command of HTTP. Generally speaking, a WEB page is a sort of program and therefore runs on a CPU in the host apparatus 300. This is true for the WEB according to the first embodiment.

S412: The WEB page 311 receives from the printer 310 a response that the standby time has been set to "5 minutes."

Figure 5:
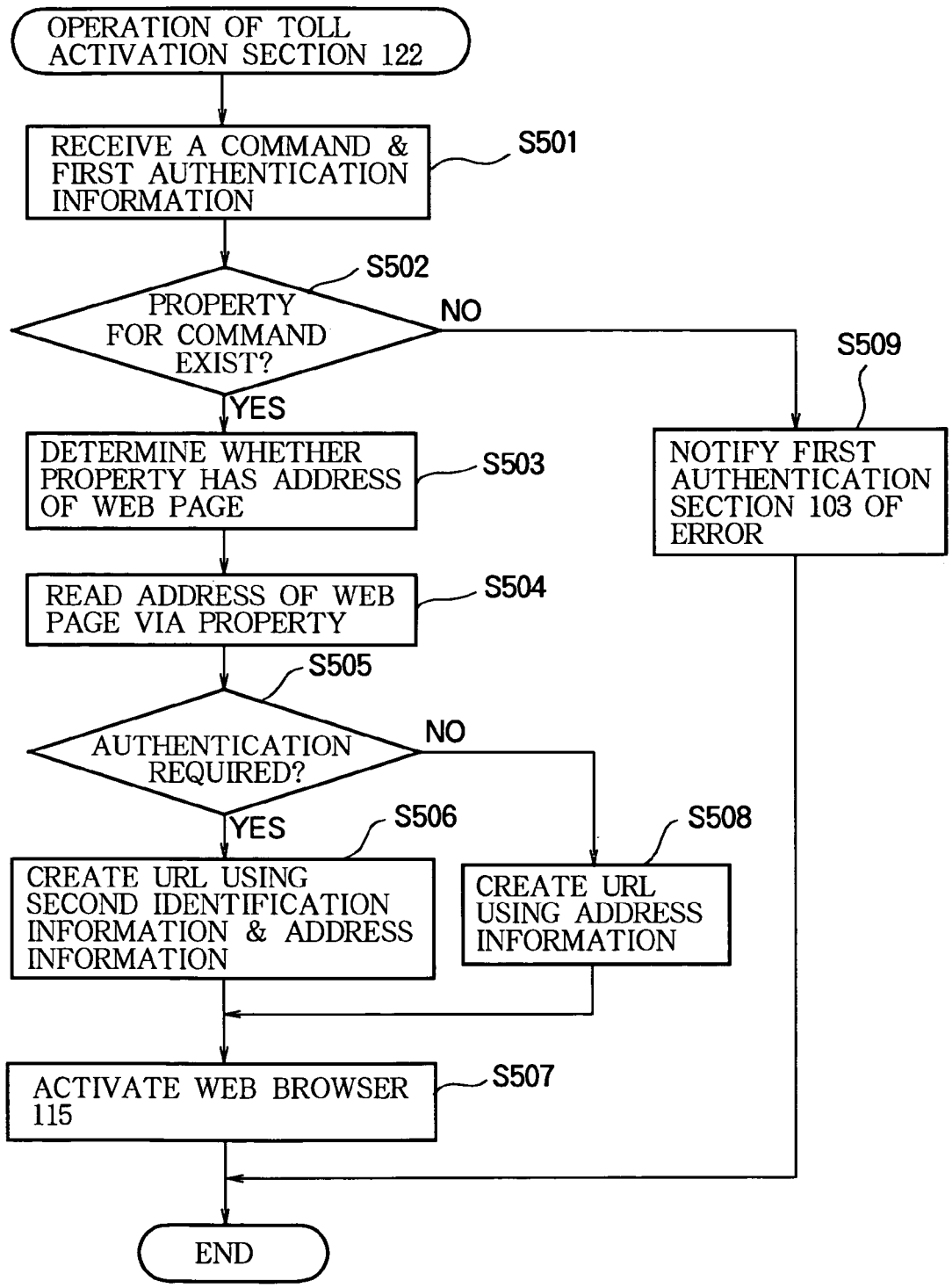
FIG. 5 is a flowchart illustrating the operation of calling a WEB page via a WEB browser.

FIG. 5 is a flowchart illustrating the operation at S410 in FIG. 4, i.e., the operation of calling the WEB page 311 via the WEB browser 115. The operation is carried out in the tool activation section 110. The operation will be described in detail with reference to FIG. 5.

S501: The tool activation section 110 receives a command from the user and the first authentication information (the result of authentication) from the first authentication section 103.

S502: A check is made to determine whether a property corresponding to the command exists, thereby determining whether a WEB page corresponding to the command exists. If it is determined that an address for the WEB page corresponding to the command exists, then the program proceeds to S503. If the address for the WEB page corresponding to the command does not exist, then the program proceeds to S509.

S503: In order to read the WEB page 311 that corresponds to the command, the tool activation section 110 needs to know the address of the WEB page corresponding to the command. For this purpose, a check is made to determine whether the property corresponding to the command has the address of the WEB page 311. FIG. 8 is a table stored in the tool activation section 110, the table listing properties and corresponding commands. The tool activation section 110 uses a command as a key to retrieve a corresponding address from the properties.

S504: An address for the WEB page 311 to be accessed is read from the properties.

S505: A check is made to determine whether authentication is required for calling the WEB page 311 to be accessed. If the WEB page 311 requires authentication, the program proceeds to S506. If the WEB page 311 does not require authentication, the program proceeds to S508.

S506: By using the address read at S504 and the first authentication information received at S501, a URL is created and then passed to the WEB browser 115. URL stands for Universal Resource Locator and is a location of a WEB page. Here, the term URL is used to reference to address information described in the format that the WEB browser 115 can be connected properly. By combining the address information and the first authentication information together, a URL is created as follows:

The protocol for the URL is http:// for the following:
(1) Address of printer 310: 10.20.30.40
(2) Name of file to be called: /Printer/energy/energy.html
(3) Authentication (Result of authentication): a=XXXXX and b=YYYYY Following http://, the address to be communicated with is described and then common.cgi is described. Common.cgi is the name of the operating program of the printer 310. Then, "?" follows which is an argument description for the remaining part of the operating program common.cgi.

The entire URL is as follows:

http://10.20.30.40/common.cgi?a=XXXX&b=YYYY&filname=/Printer/energy/energy/html

The common.cgi receives authentication information (i.e., the result of authentication): a=XXXX and b=YYYY. The authentication information is preferably in encryption form. Then, the name of file follows the authentication information.

The common.cgi notifies the identification information decision section 206 of the authentication information. The common.cgi transfers the specified WEB page, i.e., "filename=Printer/energy/energy.html" to the host apparatus 300, so that the WEB browser 115 on the host apparatus 300 can read the WEB page, i.e., Printer/energy/energy.html.

S507: The tool activation section 110 notifies the WEB browser 115 of the thus created URL. Then, the WEB browser 115 accesses the notified URL to call the desired WEB page 311.

S508: If authentication is not required for calling the WEB page 311, the URL is created by using the address information only.

S509: If there does not exist a property corresponding to the command inputted by the user, error is notified to the command decision section 102 via the authentication section 103. This step completes the description of the operation of the host apparatus 300.

Figure 6:
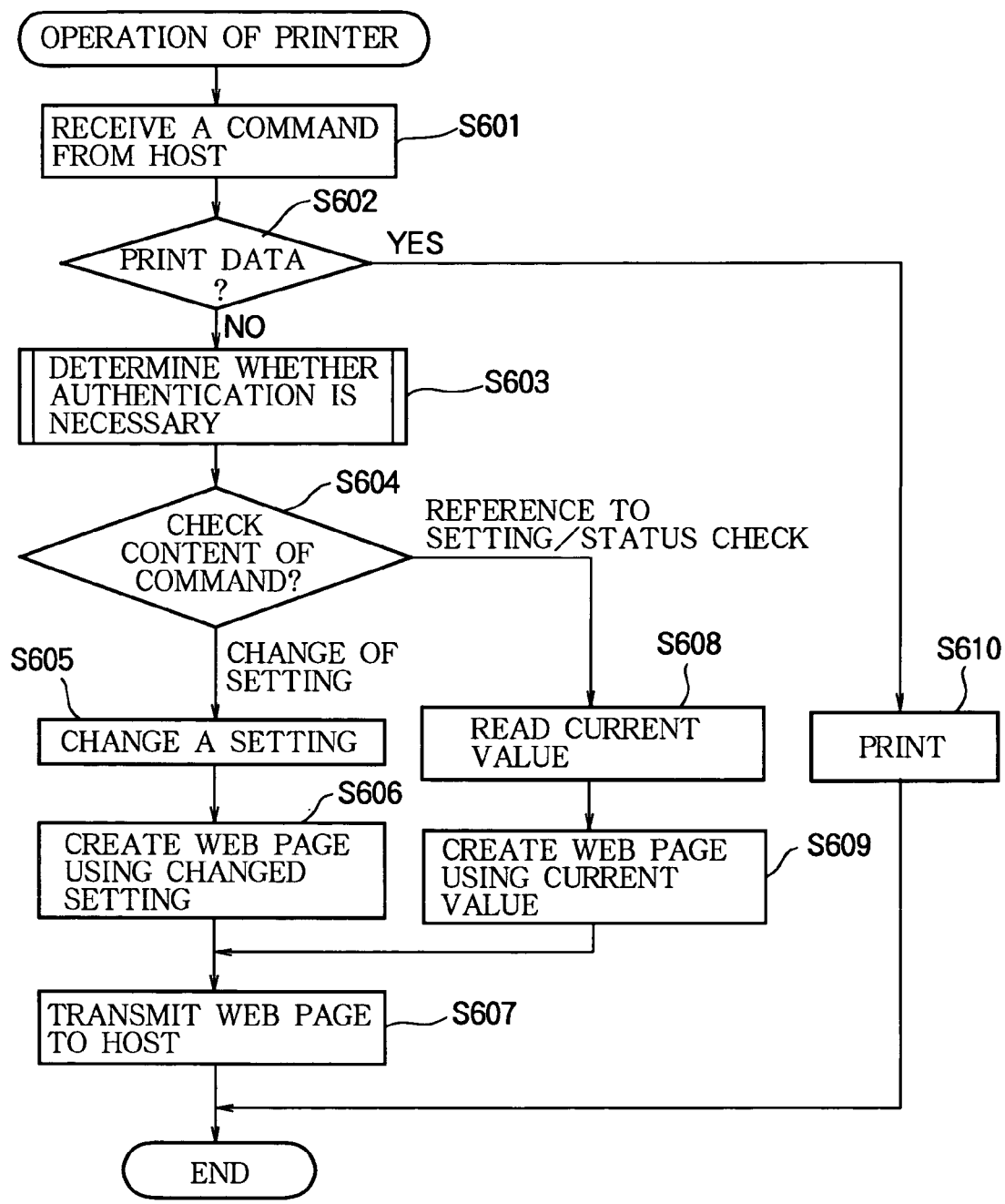
FIG. 6 is a flowchart illustrating the operation of the printer according to the first embodiment.

FIG. 6 is a flowchart illustrating the operation of the printer 310 according to the first embodiment. The operation of the printer 310 will be described with reference to FIG. 6.

S601: The receiver 202 receives the command from the host apparatus 300. The command can be received via a variety of receiving means as follows:

At S407 of FIG. 4, if modification of the standby time is commanded via MIB (protocol is SNMP), the MIB is a means via which the command is received. Similarly, at S411 of FIG. 4, if modification of the standby time is commanded via WEB (protocol is HTTP), the WEB is a means via which the command is received. Still similarly, even though the operation at S507 is a mere operation for calling a WEB page having a function in which the standby time is modified, the WEB is a means via which the command is received.

S602: A check is made to determine whether the received data is print data. Then, the print data is separated from the received data. If the received data is print data, then the program proceeds to S610. If the received data is not print data, then the program proceeds to S603. Both the command received at S601 and the means via which the command is received are retained until a response has been transmitted to the host apparatus 300.

Figure 7:
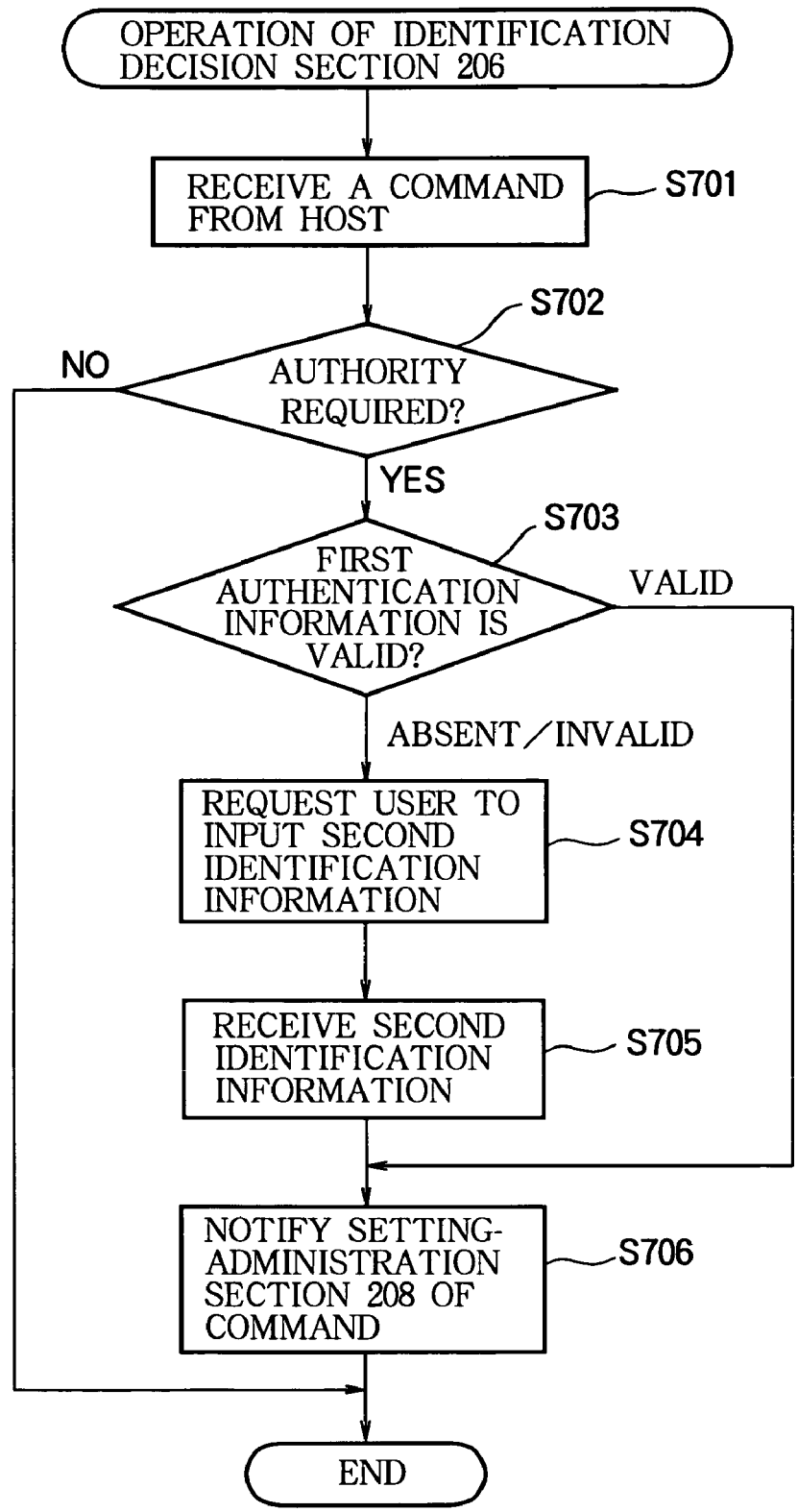
FIG. 7 is a flowchart illustrating an authentication operation described at step S603 in FIG. 6.

S603: A check is made to determine whether the received command requires second authentication. This process will be described later in detail (FIG. 7).

S604: A check is made to determine whether the command is to change the setting of the printer 310, reference to the setting, or check the status of the printer 310. If the command is to change the setting, the program proceeds to S605. If the command is to reference to the setting or check the status, the program proceeds to S608.

S605: The value of the setting is modified. Because the command at steps S407 and S410 in FIG. 4 is to modify the standby time, the identification information decision section 208 writes "5 minutes" into the item of standby time in the data base 207.

After writing the standby time of "5 minutes", the identification information decision section 206 reads the item of standby time after modification and produces a response in the form suitable for the means that received the command. The command that is processed at S407 in FIG. 4 is received via MIB (protocol is SNMP) and therefore the response in the form suitable for MIB is produced. Likewise, the command that is processed at S410 in FIG. 4 is received via WEB (protocol is HTTP) and therefore the response in the form suitable for WEB is produced. That is, when the response is produced in the form suitable for WEB, the form administration section 211 reads the WEB page from the setting form 210, the WEB page having a blank area to be filled. Then, the form administration section 211 stores the standby time into the blank area read from the setting-administration section 208. The detailed description of MIB will be omitted in the first embodiment.

S607: The WEB page produced at S606 is transmitted via the transmitter 203 to the host apparatus 300.

S608: For a case where a setting is to be referenced to, the setting-administration section 208 will not change the setting in the data base 209 but reads a current value and notifies the form administration section 211 of the current value.

S609: The form administration section 211 reads from the setting form 210 a WEB page having a blank area into which an appropriate setting should be entered. Then, the form administration section 211 enters a new value into the blank area, the new value having been read by the setting-administration section 208 from the data base 209.

S610: The print data is printed.

FIG. 7 is a flowchart illustrating the authentication described at S603 in FIG. 6. The operation of performing the authentication at S603 will be described with reference to FIG. 7.

S701: The printer receives a command from the host apparatus 300.

S702: The identification information decision section 206 checks the received command to determine whether authentication is required before the command is executed. The identification information decision section 206 knows commands that require authentication. If the received command requires authentication, the program proceeds to S703, if not, the program ends.

S703: If the first authentication information received from the host apparatus 300 is "VALID," then it is determined that the command has passed the first authentication in the host apparatus 300. Thus, the second authentication in the printer 310, which has the same authentication level as the first authentication, is not activated, and the program proceeds to S706. If the first authentication information is "INVALID" or has not been received from the host apparatus 300, it is determined that the command has not passed the first authentication in the host apparatus 300, and the program proceeds to S704.

S704: The second authentication is activated, so that the form administration section 211 requests the user to input the second identification information. The request is sent via a means that received the command from the host apparatus 300. For example, if the command was received via WEB, the request is transmitted via WEB.

The printer 310 receives the second identification information from the user. The identification information decision section 206 performs the second authentication. That is, the identification information decision section 206 reads the pre-registered second identification information from the identification information data base 207 and compares the pre-registered second identification information with the second identification information received from the user.

If the two items of second identification information are the same, the program proceeds to S706. If the two items of second identification information are different from each other, then the identification information decision section 206 requests the user to re-input the second identification information. Then, the identification information decision section 206 compares the two items of second identification information again. If the user refuses to re-input the second identification information, it is determined that the command received at S701 was cancelled.

S706: The identification information decision section 206 notifies the setting-administration section 208 of the command received at S701.

Second Embodiment

Figure 9:
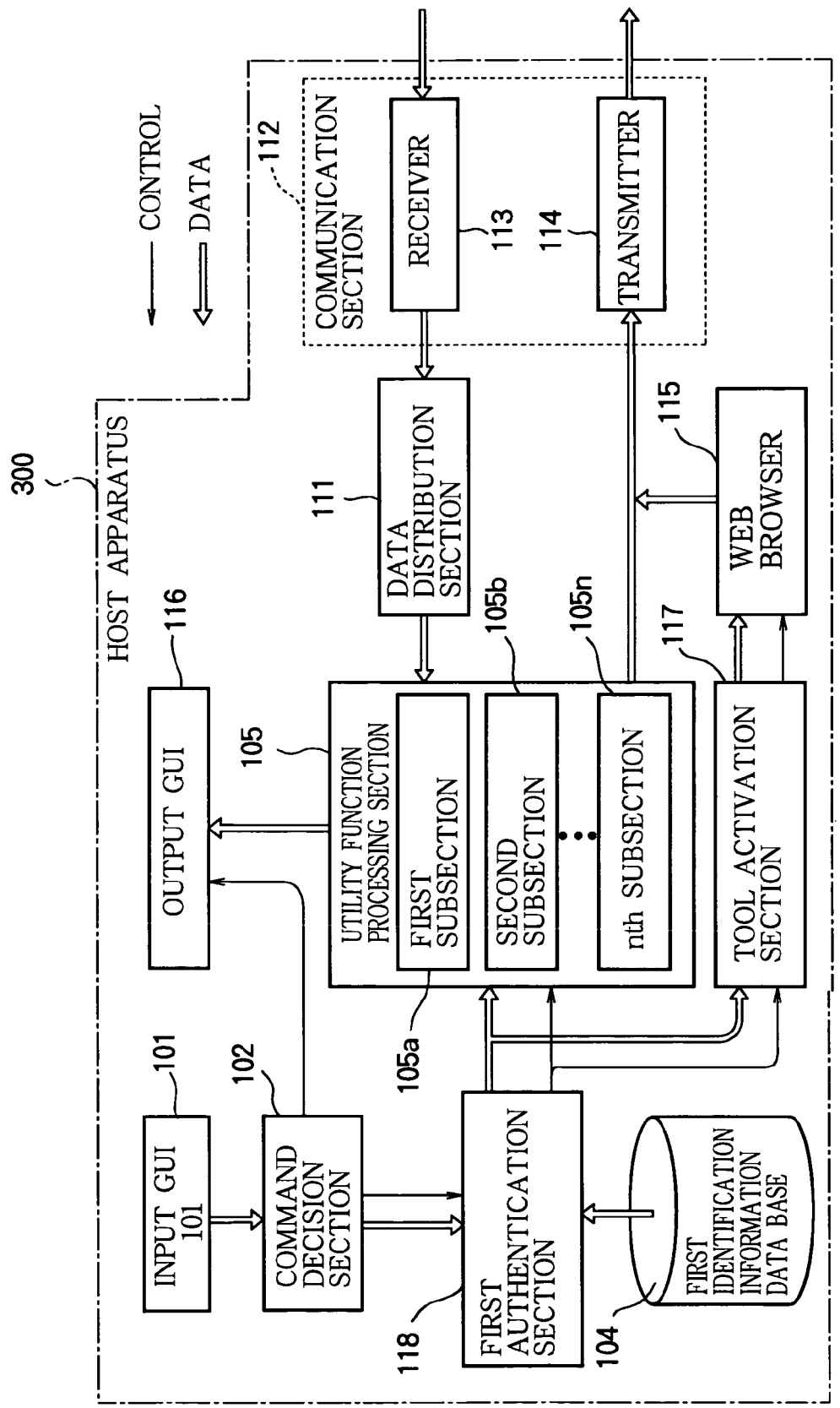
FIG. 9 is a block diagram illustrating a host apparatus according to a second embodiment.

FIG. 9 is a block diagram illustrating a host apparatus 300 according to a second embodiment.

An input GUI 101 receives information inputted by a user. The input information includes a request (refereed to as a command hereinafter) from the user and identification information of the user. The identification information of a user is information that identifies the user. The identification information takes the form of, for example, a password and user ID (account). The identification information of a user in the host apparatus 300 is first identification information.

A command decision section 102 receives the information inputted by the user through the input GUI 101 and reads a command into the host apparatus 300. The command decision section 102 then selects an appropriate subsection from among subsections in a utility function processing section 105 via the first authentication section 118. Some commands require authentication. If such a command is received, then the command decision section 102 requests through an output GUI section 116 the user to input identification information that identifies the user, i.e., first identification information. When the user inputs the first identification information, the input GUI 101 transfers the first identification information to the command decision section 102.

If the information inputted by the user through the input GUI 101 contains the first identification information that identifies the user, the command decision section 102 will not request the user through the output GUI section 116 the user to input identification information that identifies.

The command decision section 102 sends a command read from the received information, a subsection corresponding to the command, and the first identification information to a first authentication section 118.

The first authentication section 118 compares the first identification information received from the command decision section 102 with the first identification information read from a first identification information data base 104 to produce first authentication information. This operation is called first authentication in the second embodiment. The first identification information data base 104 is a data base that holds pre-registered first identification information.

If the two items of first identification information coincide, the first authentication section 103 sends a comparison result and the command received from the command decision section 102 to the corresponding subsection in the utility function processing section 105.

If a WEB browser 115 is to be activated, the command decision section 102 controls a tool activation section 117 to activate a tool in a printer.

The utility function processing section 105 includes n different functions; a first subsection 105a, a second subsection 105b, . . . , and an n-th subsection 105n. The utility function processing section 105 transmits information to the printer 310 via a transmitter 114 and receives information from the printer 310 via a receiver 113 and a received data decoder 111.

A tool activation section 117 operates to activate functions that the host apparatus 300 has not. By way of example, the second embodiment will be described in terms of an operation that activates a WEB page 311 (FIG. 3) installed in the printer 310.

The tool activation section 117 sends an address indicative of a specific WEB page installed in the printer 310 and the first authentication information received from the first authentication section 103 to the WEB browser 115, thereby activating the WEB browser 115.

During the communication with the printer 310 to activate a function in the utility function processing section 105, the received data decoder 111 checks the content of the data received from the printer 310 and then directs the data to a corresponding subsection in the utility function processing section 105.

A communication section 112 is a communication processing section through which the respective sections in the host apparatus 300 communicate with other external apparatus connected to the host apparatus 300. In the second embodiment, the communication section 112 takes the form of a network interface. The respective sections in the host apparatus 300 receive information through the receiver 113 from the external apparatus. The respective sections in the host apparatus 300 send information through the transmitter 114 to the external apparatus.

The WEB browser 115 is a common WEB browser that may be activated when a tool activation section 117 communicates with an external apparatus. The WEB browser 115 reads a WEB page in accordance with an address supplied from the tool activation section 117.

Through the output GUI section 116, the host apparatus 300 displays information to the user as well as requests the user to input the first identification information, if necessary. This completes the description of the host apparatus 300 according to the second embodiment.

Figure 10:
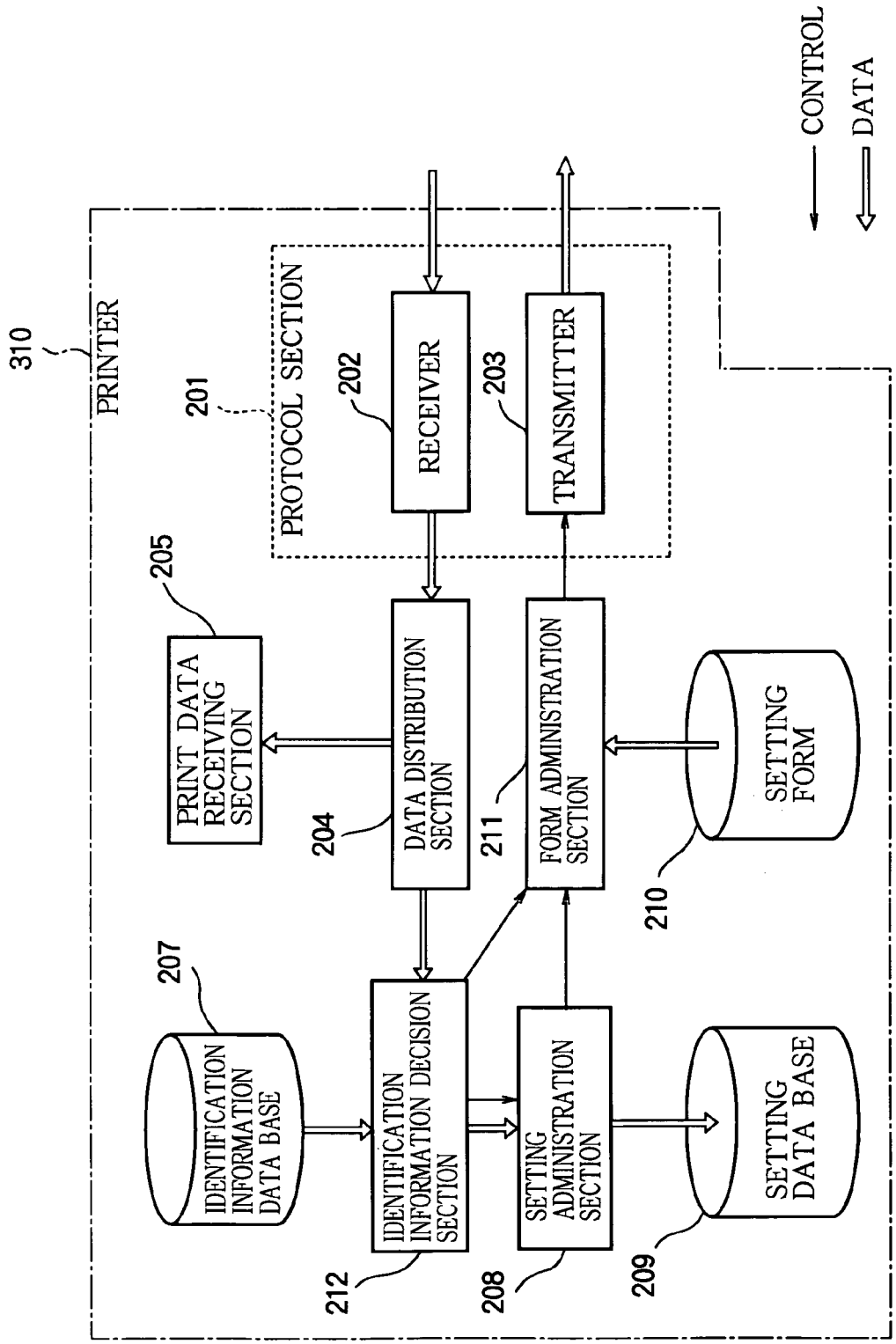
FIG. 10 is a block diagram of a printer according to the second embodiment.

FIG. 10 is a block diagram of the printer 310 according to the second embodiment. The operations of from a protocol section 210 to a print data receiving section 205 in the second embodiment are the same as those in the first embodiment. The second embodiment uses an identification information decision section 212 in place of the identification information decision section 212.

The configuration of an identification information data base 207, a setting administration section 208, a setting data base 209, the setting form 210, and a form administration section 211 is the same as that of the first embodiment.

The identification information decision section 212 determines whether the command supplied from the data distribution section 204 was inputted by an authorized person (hereinafter network administrator).

If the received information contains the first identification information indicative of a network administrator, then the identification information decision section 212 determines whether the identification information is valid or invalid. If it is valid, then the identification information decision section 212 notifies the setting-administration section 208 of the command.

If the identification information is invalid or the received information does not contain the identification information, then the identification information decision section 212 determines that the request has not successfully passed the first authentication performed in the first authentication section 118. Then, through a form administration section 211, the identification information decision section 212 requests the host apparatus 300 of the second identification information indicative of a network administrator.

The second identification information is used when an authentication function is performed in the printer 310 (referred to as second authentication). The second authentication is activated when the user accesses the WEB page in the printer 310 directly from the host apparatus 300.

When the identification information decision section 212 notifies the setting-administration section 208 and form administration section 211, the identification information decision section 212 also notifies these sections of a means that received the information or at least information indicative of which means received the information.

The first identification information received is determined as follows: The identification information decision section 212 reads the second identification information from the identification information data base 20. Then, the identification information decision section 212 compares the received first identification information with the second identification information read from the identification information data base 207. If the two items of information coincide, then it is determined that the received first identification information is valid. If the two items of information do not coincide, then it is determined that the received first identification information is invalid.

The outline of the second embodiment will be described with reference to FIG. 3. In order that the user can use the utilities 301 on the host apparatus 300, it is necessary to first perform authentication (referred to as first authentication) of the user. This authentication is called first authentication in the embodiment and is carried out in such a way that the user inputs information indicative of a network administrator (first identification information) into the host apparatus 300.

Here, identification information indicative of a network administrator refers to, for example, a user ID, an account name, and a password. Thereafter, if the user activates a function that is not found in the utilities 301 but displayed on the screen, the host apparatus 300 will read the WEB page 311 of the printer 310.

In the second embodiment, the host apparatus.300 notifies the printer 310 of the identification information that identifies an authorized person. Thus, the printer 310 implements the command without activating an authentication function installed in the printer 310, i.e., second authentication, thereby allowing the host apparatus 300 to read the WEB page 311.

In the second embodiment, a "first setting means" is a function of the utility 301 that, for example, references to and changes the settings of the printer 310 and its options and checks the status of the printer 310 and its options. A "second setting means" is a function that references to and changes the settings of the printer 310 and its options, and checks the status of the printer 310 and its options, the second setting means being activated via the WEB page 311. The system may be configured in such a way that the first setting means (utilities 301) has only a function that references to the settings in the printer 310, and the second setting means takes care of changing of the settings via the WEB browser 115.

The operation of the host apparatus 300 is the same as the first embodiment except for the following.

Figure 11:
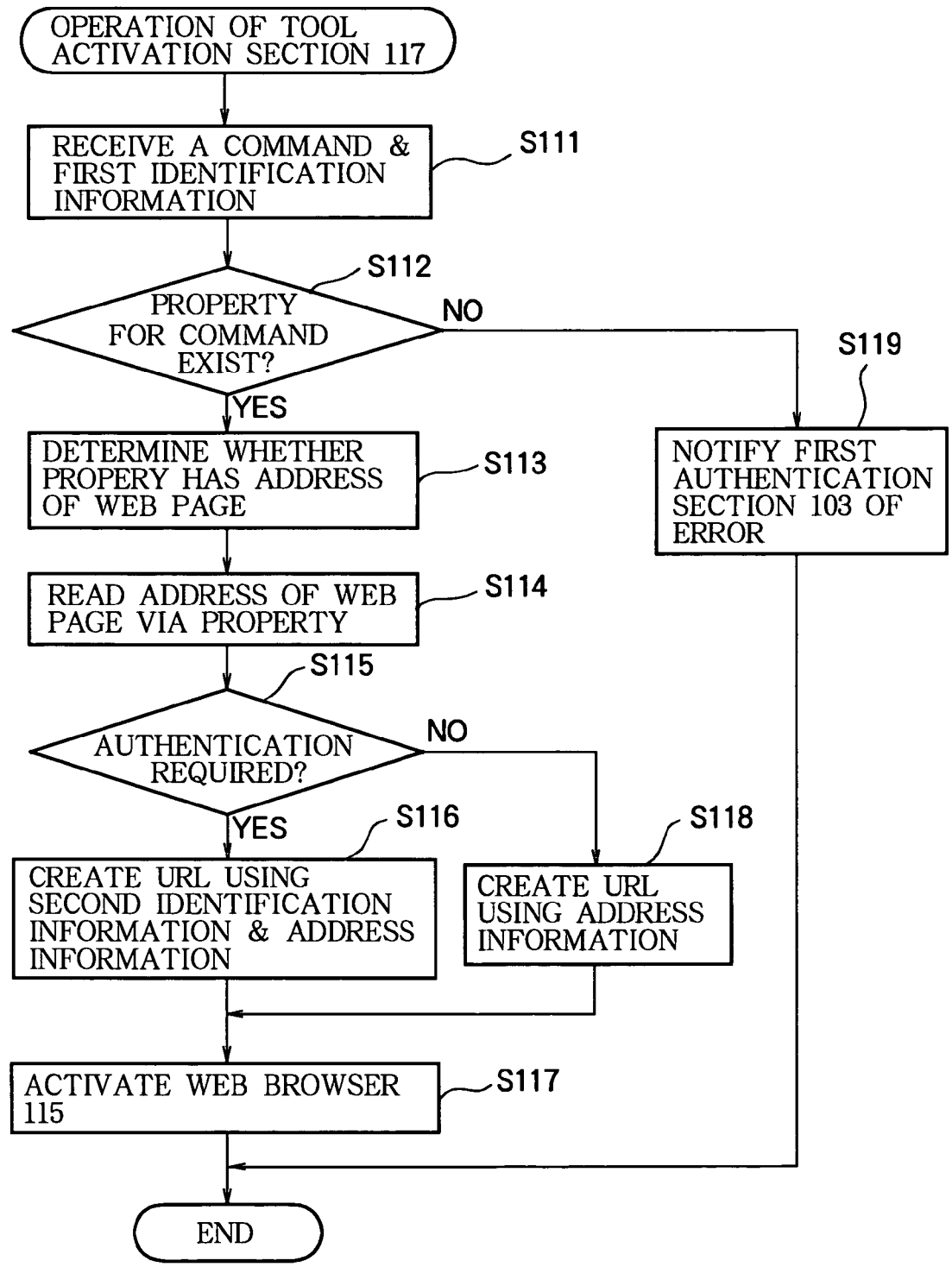
FIG. 11 is a flowchart illustrating the operation in which a tool activation section reads a WEB page by means of a WEB browser.

If the function commanded by the user is absent from the utilities 301 provided for the respective operating systems, the tool activation section 117 reads the WEB page 311 by means of the WEB browser 115. FIG. 11 is a flowchart illustrating the operation in which the tool activation section 117 reads the WEB page 311 by means of the WEB browser 115. The operation will be described in detail with reference to FIG. 11.

S111: The host apparatus 300 receives a command from the user of the utilities 301. In the second embodiment, the first authentication section 118 notifies the tool activation section 117 of the first identification information.

S112: A check is made to determine whether a property corresponding to the command is present in the printer 310, thereby determining whether a WEB page 311 corresponding to the command is resident in the printer 310. The property will be described at S113. If there is the address for the WEB page 311 that corresponds to the command, then the program proceeds to S113; if not, the program proceeds to S119.

S113: The content of the property of the WEB page 311 to be read is checked. The tool activation section 117 needs to know the address of the WEB page 311 corresponding to the command. For this purpose, a check is made to determine whether there are properties corresponding to the respective commands and the properties have addresses for the WEB pages.

FIG. 8 lists properties for the respective commands, the properties being stored in the tool activation section 117. The tool activation section 117 searches the properties to obtain an address corresponding to the command.

S114: An address for the WEB page 311 to be accessed is read from the properties.

S115: A check is made to determine whether authentication is required for calling the WEB page 311 to be accessed. If the WEB page 311 requires authentication, the program proceeds to S116. If the WEB page 311 does not require authentication, the program proceeds to S118.

S116: By using the address read at S114 and the first authentication information received at S111, a URL is created and passed to the WEB browser 115. URL stands for Universal Resource Locator and is a location of a WEB page. Here, the term URL is used to reference to address information described in the format with which the WEB browser can be connected properly.

Combining the address information and the first authentication information together, a URL is created as follows:

The protocol for the URL is http:// for the following:
(1) Address of printer 310: 10.20.30.40
(2) Name of file to be called: /Printer/energy/energy.html
(3) First identification information: name=VVVV and b=ZZZZ Following http://, the address to be communicated with is described, and then common.cgi is described. Common.cgi is the name of the operating program in the printer.

The remaining part follows "?," which is an argument description for the operating program common.cgi. Therefore, the entire URL is as follows: http://10.20.30.40/common.cgi?name=VVVV&pass=ZZZZ&filename=/Printer/energy/energy.html The common.cgi receives the first identification information (i.e., result of authentication): a=VVVV and b=ZZZZ. The first identification information is preferably in encryption form. Then, the name of file is received. The common.cgi notifies the identification information decision section 212 of authentication information.

The common.cgi transfers the specified WEB page, i.e., filename=Printer/energy/energy.html to the host apparatus 300, so that the WEB browser 115 on the host apparatus 300 can read the WEB page 311, i.e., /Printer/energy/energy.html.

S117: The tool activation section 110 notifies the WEB browser 115 of the thus created URL. Then, the WEB browser 115 accesses the notified URL to call the desired WEB page 311.

S118: If authentication is not required for calling the WEB page 311, the URL is created by using the address information only.

S119: If there does not exist a property corresponding to the command inputted by the user, error is notified to the command decision section 102 via the authentication section 103. This step completes the description of the operation of the host apparatus 300.

The operation of the printer 310 is the same as the first embodiment except for the following. If the command received from the host apparatus 300 is to reference to or change the settings of the setting form 210 and its options, or to check the settings of the setting form 210 and its options, the command is sent to the identification information decision section 212 via the receiver 202 and the data distribution section 204.

Figure 12:
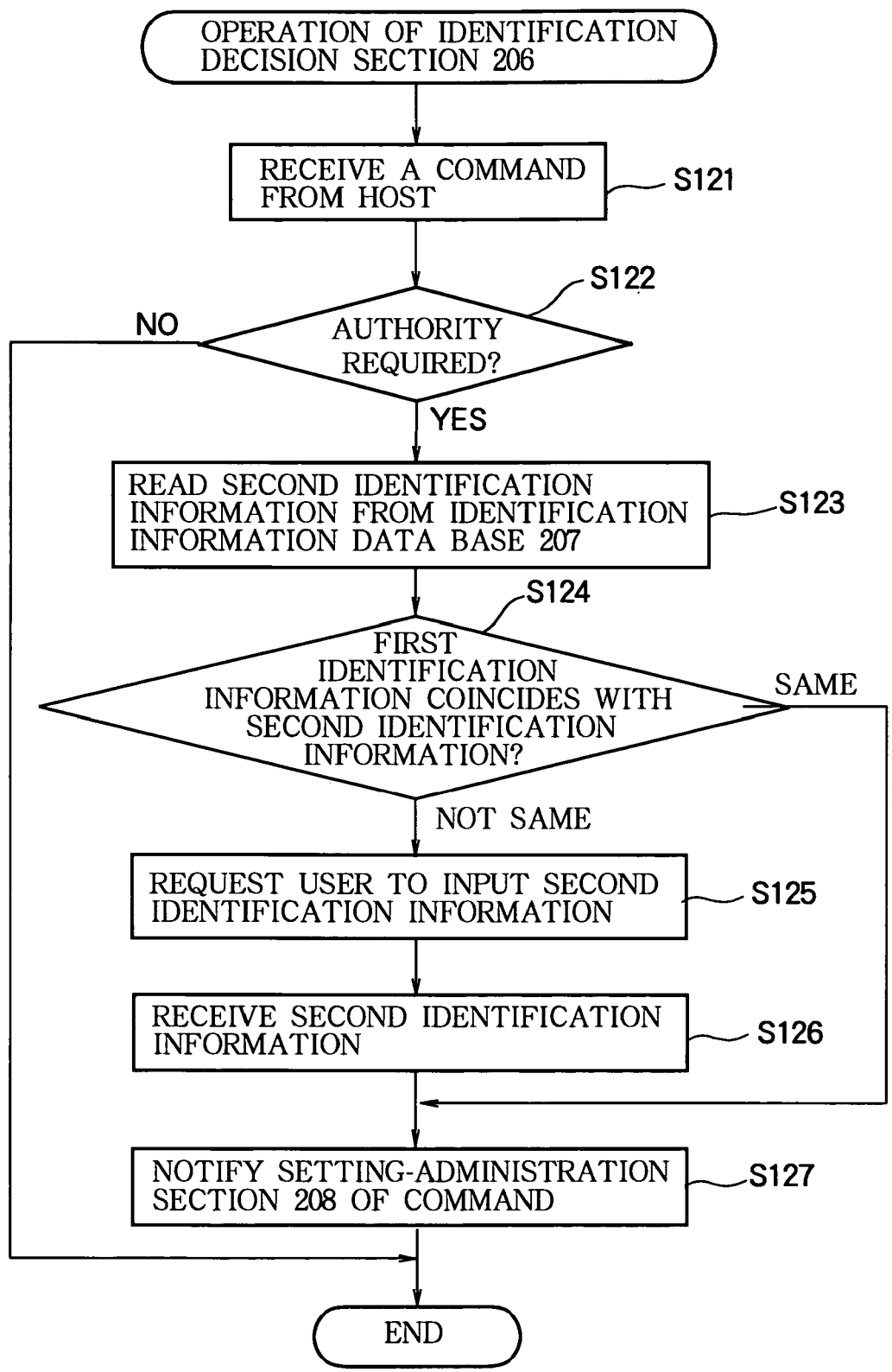
FIG. 12 is a flowchart illustrating the operation of an identification information decision section according to the second embodiment.

FIG. 12 is a flowchart illustrating the operation of the identification information decision section 212 according to the second embodiment. The operation of the printer 310 will be described with reference to FIG. 12.

S121: The receiver 202 receives the command from the host apparatus 300.

S122: A check is made to determine whether the received command requires authentication. The identification information decision section 212 knows commands that require authentication and determines whether the received command requires authentication. If the received command requires authentication, the program proceeds to S123. If the received command requires no authentication, the program ends.

S123: The identification information decision section 212 reads the second identification information from the identification information data base 207.

S124: The identification information decision section 212 compares the second identification information read from the identification information data base 207 with the first identification information received from the host apparatus 300. If the first identification information has been received from the host apparatus 300 and the first identification information received from the host apparatus 300 is the same as the second identification information read from the identification information data base 207, then it is determined that the first authentication has been passed successfully. Therefore, the second authentication in the printer 310, which has the same authentication level as the first authentication, is not activated. Then, the program proceeds to S127. If the first identification information has not been received from the host apparatus 300 yet, it is determined that the first authentication in the host apparatus 300 has not been passed successfully. Thus, the program proceeds to S125.

S125: The identification information decision section 217 activates the second authentication to request the user of the second identification information via the form administration section 211. If the command is received via the WEB (protocol is http), then the second identification information is requested via the WEB.

S126: The printer 310 receives the second identification information from the user. Then, the identification information decision section 212 reads the second identification information from the identification information data base 207, and compares the second identification information received from the user with the second identification information read from the identification information data base 207. This operation is called second authentication.

If the two items of the second identification information coincide, the program proceeds to S127. If the two items of second identification information do not coincide, then the identification information decision section 212 prompts the user to re-input the second identification information. Then, the identification information decision section 212 compares the second identification information that is re-inputted with the second identification information read from the identification information data base 207. If the user refuses to re-input the second identification information, it is determined that the command received at S121 was canceled.

S127: The identification information decision section 212 notifies the setting administration section 208 of the command received at S121. This completes the description of the second embodiment.

If the host apparatus 300 and the printer 310 have different items of identification information (e.g., password), authentication cannot be successfully carried out, so that the same security level is maintained. If the printer 310 and the printer are different in identification information, the printer 310 can have a security level independent of the host apparatus 300.

Third Embodiment

Figure 13:
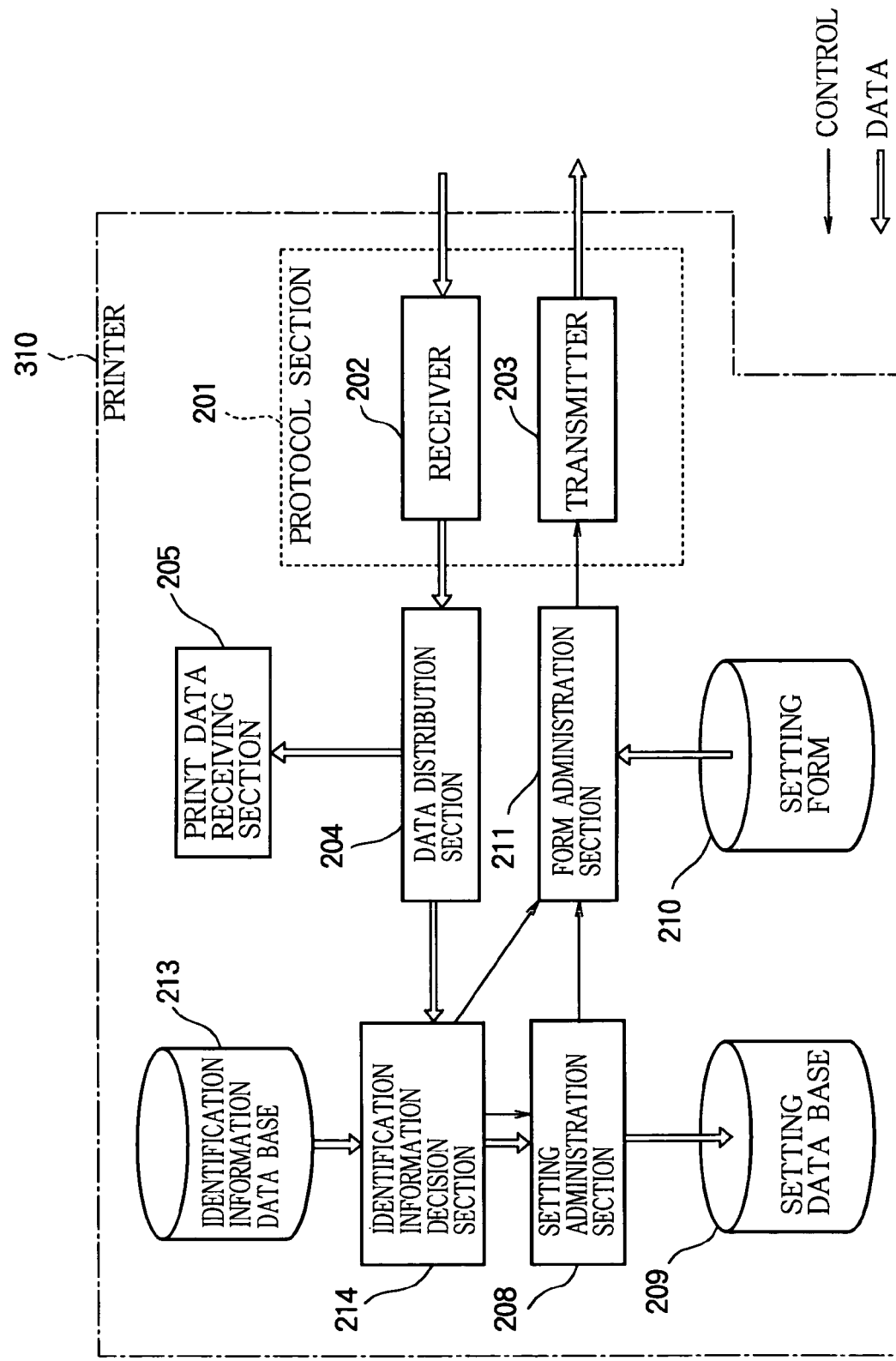
FIG. 13 is a block diagram of a printer according to a third embodiment.

The configuration of a host apparatus 300 according to a third embodiment is the same as the second embodiment in FIG. 9. FIG. 13 is a block diagram of a printer 310 according to the third embodiment. The configuration of the third embodiment will be described with reference to FIG. 13.

The operations of from a protocol section 201 to a print data receiving section 205 in the third embodiment are the same as those in the first embodiment. The third embodiment uses an identification information decision section 214 in place of the identification information decision section 206.

The identification information decision section 214 determines whether a command was inputted by an authorized person (hereinafter network administrator), the command being supplied from the data distribution section 204 and requesting to reference to and change the settings of the printer or to check the status of the printer.

If the received information contains the first identification information indicative of a network administrator, then the identification information decision section 214 determines whether the identification information is valid or invalid. If it is valid, then the identification information decision section 214 notifies the setting-administration section 208 of the command for referencing to a setting, modifying a setting, or checking the status of the printer and its options.

If the identification information is invalid or the received information does not contain the first identification information, then it is determined that the first authentication by the first authentication section 118 in the host apparatus 300 has not been passed successfully. Then, through the form administration section 211, the identification information decision section 214 requests the host apparatus 300 of the second identification information indicative of a network administrator. The second identification information is used when an authentication function is performed in the printer 310 (referred to as second authentication).

The second authentication is activated when the user accesses the WEB page in the printer 310 directly from the host apparatus 300. When the identification information decision section 214 notifies the setting-administration section 208 and the form administration section 211, the identification information decision section 214 also notifies these sections of a means that received the information or at least information indicative of which means received the information.

The first identification information is determined as follows:

The identification information decision section 214 reads the second identification information from the identification information data base 20. Then, the identification information decision section 212 compares the received first identification information with the second identification information read from the identification information data base 213.

If the train of characters of the received first identification information contains the second identification information, it is determined that the received identification information is valid. If the train of characters of the received first identification information does not contain the second identification information, it is determined that the received identification information is invalid.

An identification information data base 213 is a data base that holds pre-registered second identification information. The setting-administration section 208, setting data base 209, setting form 210, and form administration section 211 are of the same configuration as the first embodiment.

The outline of the third embodiment will be described with reference to FIG. 3. In order that the user can use the utilities 301 on the host apparatus 300, it is necessary to first perform authentication (referred to as first authentication) of the user. This authentication is carried out in such a way that the user inputs information indicative of a network administrator (first identification information such as a password) into the host apparatus 300.

Here, identification information indicative of a network administrator refers to, for example, a user ID, an account name, and a password. Thereafter, if the user activates a function that is not found in the utilities 301 but displayed on the screen, the host apparatus 300 will read the WEB page 311 of the printer 310. In the third embodiment, the host apparatus 300 notifies the printer 310 of the first identification information inputted by the user previously.

When the second identification information stored in the printer 310 is designed to have a smaller number of characters (or digits) than the first identification information, if the first identification information contains the second identification information, then it is determined that the first authentication is equivalent to the second authentication.

Thus, the printer 310 implements the command without activating an authentication function installed in the printer 310, i.e., second authentication, thereby allowing the host apparatus 300 to read the WEB page 311.

In the third embodiment, a "first setting means" is a function of the utility 301 that, for example, references to and changes the settings of the printer 310 and its options and checks the status of the printer 310 and its options. A "second setting means" is a function that references to and changes the settings of the printer 310 and its options and checks the status of the printer 310 and its options, the second setting means being activated via the WEB page 311. The first setting means may be configured in such a way that the first setting means (utilities 301) has only a function that references to the settings in the printer 310, and the second setting means takes care of changing of the settings via the WEB browser 115.

The operation of the host apparatus 300 in the third embodiment is the same as the second embodiment.

The operation of the host apparatus 310 is the same as the first embodiment except for the following.

If the command received from the host apparatus 300 is to reference to and change the settings of the setting form 210 and its options, or to check the status of the setting form 210 and its options, the received command is sent to the identification information decision section 214 via the receiver 202 and the data distribution section 204.

Figure 14:
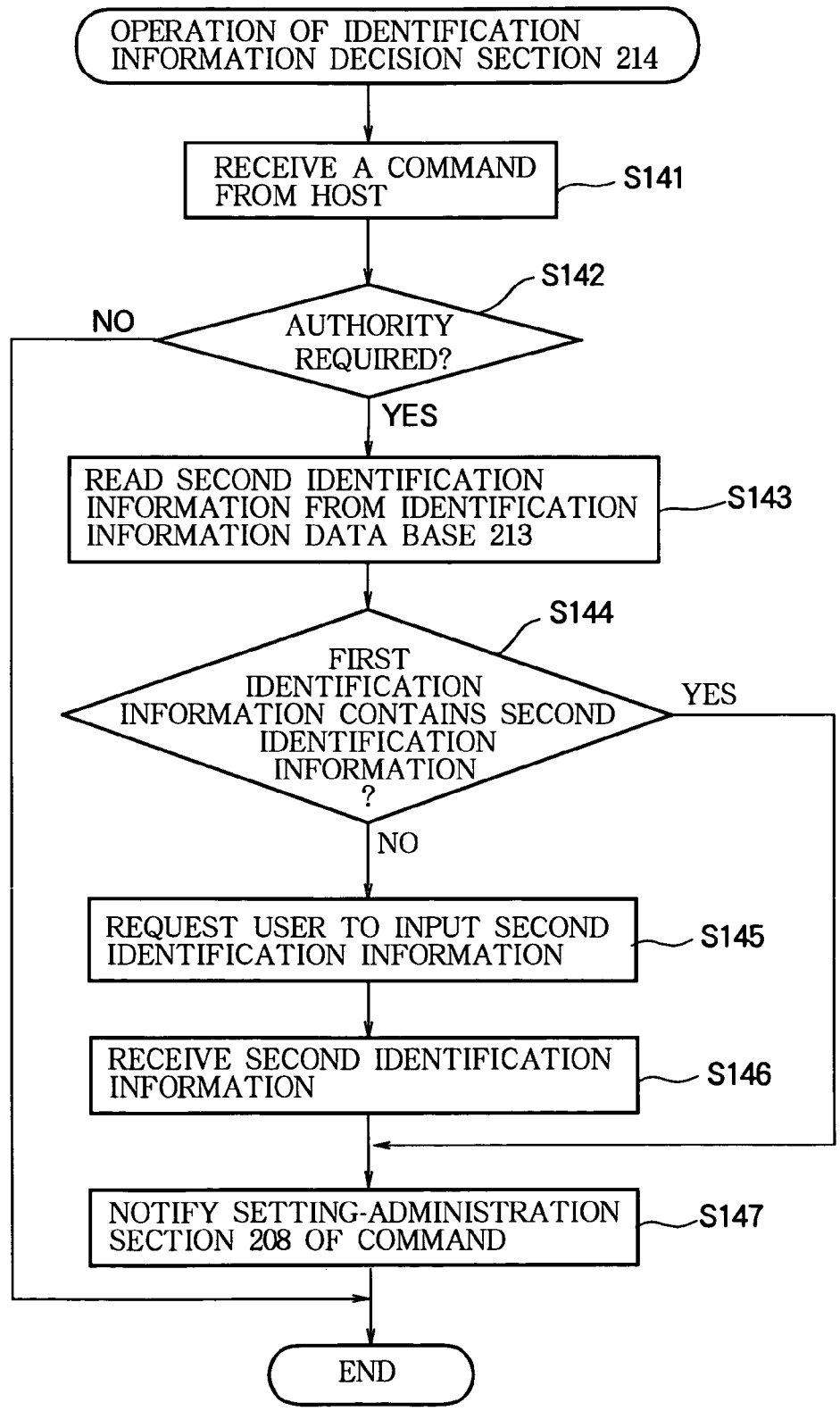
FIG. 14 is a flowchart illustrating the operation of an identification information decision section according to the third embodiment.

FIG. 14 is a flowchart illustrating the operation of the identification information decision section 214 according to the third embodiment. The operation of the identification information decision section 214 will be described in detail with reference to FIG. 14.

S141: The printer 310 receives a command from the host apparatus 300.

S142: A check is made to determine whether the received command requires authentication. The identification information decision section 214 knows commands that require authentication. If the command requires authentication, the program proceeds to S143. If the command does not require authentication, the program ends The identification information decision 214 reads the pre-registered second identification information from the identification information data base 213.

S144: The identification information decision 214 compares the pre-registered second identification information read from the identification information data base 213 at S143 with the first identification information received from the host apparatus 300. A check is made to determine that the first identification information received from the host apparatus 300 contains the second identification information read from the identification information data base 213.

FIG. 15 illustrates examples in which the character train of the first identification information contains the patterns of the second identification information.

Assuming that the first identification information has 10 characters (ten digits) and the second identification information has 4 characters (four digits). The examples include the following:

(1) The first four characters in the first identification information are identical with the four characters in the second identification information, being aligned in the same order as the four characters in the second identification information;

(2) The last four characters in the first identification information are identical with the four characters in the second identification information, being aligned in the same order as the four characters in the second identification information;

(3) Four consecutive characters anywhere in the first identification information are the same as the second identification information, being aligned in the same order as the four characters in the second identification information;

(4) The first four characters in the first identification information are the same as the second identification information, being aligned in a direction opposite to those in the second identification information;

(5) The last four characters in the first identification information are the same as the second identification information, being aligned in a direction opposite to those in the second identification information;

(6) The four consecutive characters anywhere in the first identification information are the same as the second identification information, being aligned in a direction opposite to those in the second identification information;

(7) Four characters of the second identification information are in the first identification information, being positioned irregularly in the first identification information.

Further, arbitrary characters of the second identification information may be contained in the first identification information.

If the first identification information received from the host apparatus 300 contains the second identification information, it is determined that the first authentication in the host apparatus 300 has been passed successfully. Thus, the second authentication, which has the same level of authentication as the first authentication in the host apparatus 300, is not activated.

Thus, the program proceeds to S147. If the first identification information has not been received from the host apparatus 300 or the first identification information does not contain the second identification formation, it is determined that the first authentication in the host apparatus 300 has not been passed successfully. Thus, the program proceeds to S145.

S145: The second authentication is activated so that the form administration section 211 requests the user to input the second identification information. The request is sent via a means that received the command from the host apparatus 300. For example, if the command was received via WEB, the request is transmitted via WEB.

S145: The second authentication is activated.

The printer 310 receives the second identification information form the user. The identification information decision section 214 reads the pre-registered second identification information from the identification information data base 213 and compares the pre-registered second identification information read from the identification information data base 213 with the second identification information received from the user (the second authentication).

If the two items of the second identification information are the same, the program proceeds to S147. If the two items of the second identification information are not the same, the identification information decision section 214 requests the user to re-input the second identification information. Then, the identification information decision section 214 again compares the pre-registered second identification information read from the identification information data base 213 with the second identification information re-inputted by the user. If the user refuses to re-input the second identification information, then it is determined that the command received at S141 was cancelled.

S147: The identification information decision section 214 notifies the setting administration section 208 of the command received at S141. This completes the description of the third embodiment.

The aforementioned advantages can also be obtained when the host apparatus 300 has a larger number of characters (digits) of identification information (e.g., password) than the printer 310.

There may be many cases in which the host apparatus 300 administrates a plurality of printers 310, in which case, the printers 310 may well require a higher level of security. Therefore, it is desirable that the first identification information for the host apparatus 300 contains a larger number of characters (digits) than the second identification information for the printer 310.

Fourth Embodiment

Figure 16:
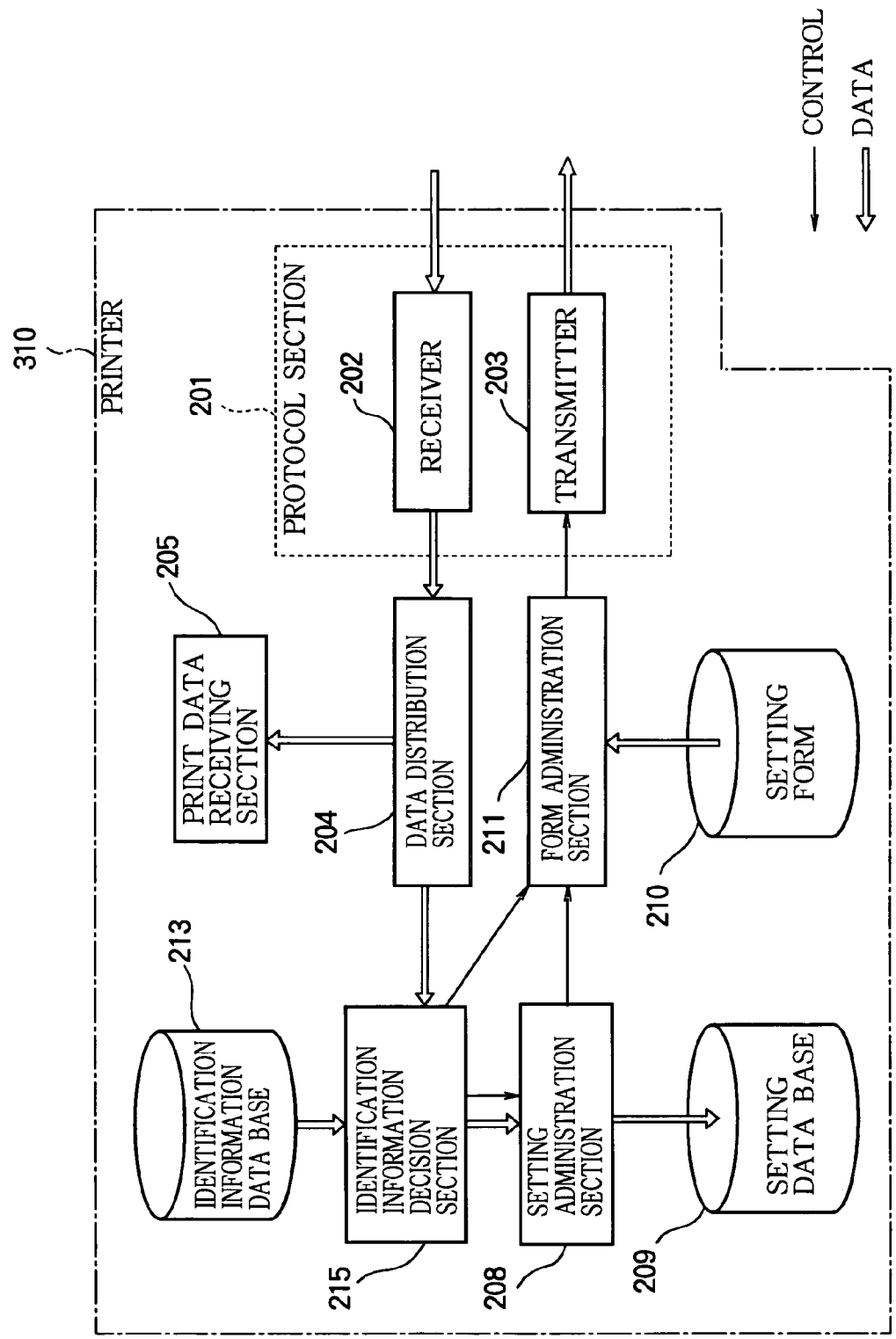
FIG. 16 is a block diagram of a printer according to a fourth embodiment.

The configuration of a host apparatus 300 according to a fourth embodiment is the same as that of the second embodiment in FIG. 9. FIG. 16 is a block diagram of a printer 310 according to the fourth embodiment. The configuration of the fourth embodiment will be described with reference to FIG. 16.

The operations of from a protocol section 201 to a print data receiving section 205 in the fourth embodiment are the same as those in the first embodiment. The fourth embodiment uses an identification information decision section 215 in place of the identification information decision section 206 of the first embodiment.

The identification information decision section 215 determines whether a command supplied from the print data receiving section 204 was inputted by an authorized person (hereinafter network administrator), the command referencing to and change the settings of the printer 310 and its options or requesting to check the status of the printer 310.

If the received information contains the first identification information indicative of a network administrator, then the identification information decision section 215 determines whether the identification information is valid or invalid. If it is valid, then the identification information decision section 215 notifies the setting administration section 208 of the command for referencing to or modifying a setting.

If the identification information is invalid or the received information does not contain the first identification information, then it is determined that the first authentication performed in the first authentication section 118 (FIG. 9) of the host apparatus 300 has not been passed successfully. Then, through the form administration section 211, the identification information decision section 215 requests the user to input the second identification information indicative of a network administrator.

The second identification information is used when an authentication function is performed in the printer 310 (referred to as second authentication).

The second authentication is activated when the user accesses the WEB page in the printer 310 directly from the host apparatus 300. When the identification information decision section 215 notifies the setting-administration section 208 and the form administration section 211, the identification information decision section 214 also notifies these sections of a means that received the information or at least information indicative of which means received the information.

The first identification information is determined as follows: The identification information decision section 215 reads the second identification information from the identification information data base 213. Then, the identification information decision section 215 compares the first identification information received via the receiving means with the second identification information read from the identification information data base 213.

If the train of characters of the second identification information read from the identification information data base 213 contains the first identification information received via the receiving means, then it is determined that the received first identification information is valid. If not, it is determined that the received first identification information is invalid.

An identification information data base 213 is a data base that holds the pre-registered second identification information. The setting administration section 208, a setting data base 209, a setting form 210, and the form administration section 211 are of the same configuration as the first embodiment.

The outline of the fourth embodiment will be described with reference to FIG. 3. In order that the user can use the utilities 301 on the host apparatus 300, it is necessary to first perform authentication (referred to as first authentication) of the user. This authentication is carried out in such a way that the user inputs information indicative of a network administrator (first identification information such as a password) into the host apparatus 300.

Here, information indicative of a network administrator refers to, for example, a user ID, an account name, and a password. Thereafter, If the user activates a function that is not found in the utilities 301 but displayed on the screen, the host apparatus 300 reads the WEB page 311 of the printer 310.

In the fourth embodiment, the host apparatus 300 notifies the printer 310 of the first identification information inputted by the user previously.

In the fourth embodiment, the first identification information stored in the printer 310 is designed to have a smaller number of characters (or digits) than the second identification information (information indicative of a network administrator). If the second identification information contains the first identification information, then it is determined that the result of the second authentication (in the printer 310) is equivalent to that of the first authentication.

Thus, the printer 310 implements the command without activating an authentication function installed in the printer 310, i.e., second authentication, thereby allowing the host apparatus 300 to read the WEB page 311.

In the fourth embodiment, a "first setting means" is a function of the utility 301 that, for example, references to and changes the settings of the printer 310 and its options, and checks the status of the printer 310 and its options.

A "second setting means" is a function that references to and modifies the settings of the printer 310 and its options, and checks the status of the printer 310 and its options, the second setting means being activated via the WEB page 311.

The system may be configured in such a way a way that the first setting means (utilities 301) has only a function that references to the settings in the printer 310, and the second setting means takes care of changing of the settings via the WEB browser 115.

The operation of the host apparatus 300 in the fourth embodiment is the same as the second embodiment.

The operation of the printer 310 is the same as the first embodiment except for the following.

If the command received from the host apparatus 300 is to reference to or change the settings of the setting form 210 and its options, or to check the status of the setting form 210 and its options, the received command is sent to the identification information decision section 215 via the receiver 202 and the data distribution section 204.

Figure 17:
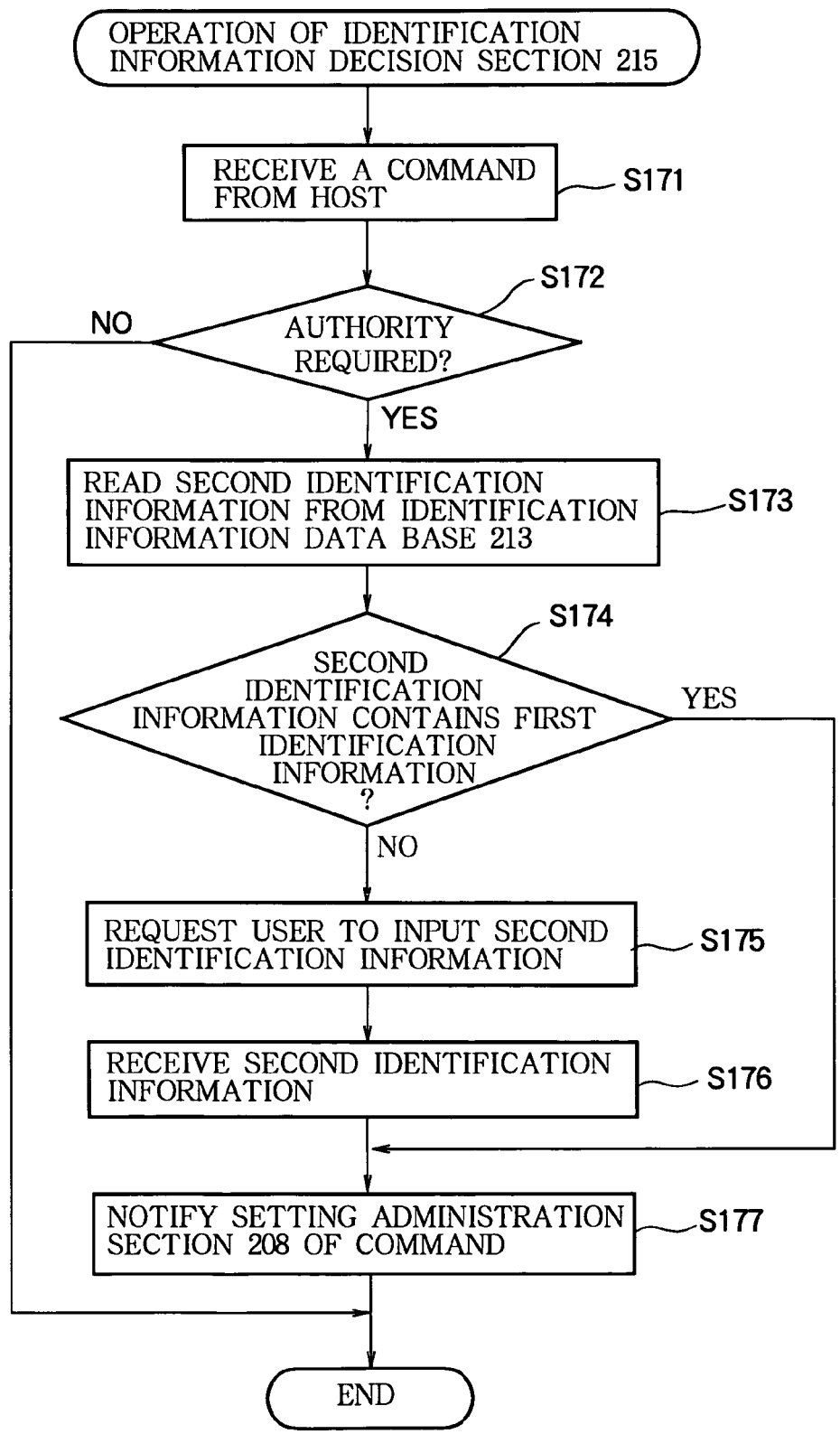
FIG. 17 is a flowchart illustrating the operation of an identification information decision section according to the fourth embodiment.

FIG. 17 is a flowchart illustrating the operation of the identification information decision section 215 according to the fourth embodiment. The operation of the identification information decision section 215 will be described in detail with reference to FIG. 17.

S171: The printer 310 receives a command from the host apparatus 300.

S172: A check is made to determine whether the received command requires authentication. The identification information decision section 215 knows commands that require authentication.

If the command requires authentication, the program proceeds to S173. If the command does not require authentication, the program ends.

S173: The identification information decision section 215 reads the pre-registered second identification information from the identification information data base 213.

S174: The identification information decision section 215 compares the pre-registered second identification information read at S173 from the identification information data base 213 with the first identification information received from the host apparatus 300.

A check is made to determine that the train of characters of the second identification information read from the identification information data base 213 contains the first identification information received from the host apparatus 300.

FIG. 18 illustrates examples in which the train of characters of the second identification information contains the patterns of the first identification information.

Assuming that the second identification information has 10 characters (ten digits) and the first identification information has 4 characters (four digits). The examples include the following:

(1) The first four characters in the second identification information are identical with the four characters in the first identification information, the first four characters being aligned in the same order as the four characters in the first identification information;

(2) The last four characters in the second identification information are identical with the four characters in the first identification information, the last four characters being aligned in the same order as the four characters in the first identification information;

(3) Four consecutive characters anywhere in the second identification information are the same as the first identification information, being aligned in the same order as the four characters in the first identification information;

(4) The first four characters in the second identification information contain the same characters as the first identification information, being aligned in a direction opposite to those in the first identification information;

(5) The last four characters in the second identification information contain the same characters as the first identification information, being aligned in a direction opposite to those in the first identification information;

(6) Four consecutive characters of the first identification information are anywhere in the second identification information, being aligned in a direction opposite to those in the second identification information;

(7) The characters of the first identification information are in the second identification information, being positioned irregularly in the second identification information.

Further, arbitrary characters of the first identification information may be contained in the second identification information.

If the second identification information contains the first identification information received from the host apparatus 300, it is determined that the first authentication in the host apparatus 300 has been passed successfully. Thus, the second authentication, which has the same level of authentication as the first authentication in the host apparatus 300, is not activated.

Thus, the program proceeds to S177. If the first identification information has not been received from the host apparatus 300 or the second identification information does not contain the first identification information, it is determined that the first authentication in the host apparatus 300 has not been passed successfully. Thus, the program proceeds to S175.

S175: The second authentication is activated so that the form administration section 211 requests the user to input the second identification information. The request is sent via a means that received the command from the host apparatus 300. For example, if the command was received via WEB, the request is transmitted over WEB.

S176: The printer 310 receives the second identification information form the user.

The identification information decision section 215 reads the pre-registered second identification information from the identification information data base 213 and compares the pre-registered second identification information read from the identification information data base 213 with the second identification information received from the user (the second authentication).

If the two items of the second identification information are the same, the program proceeds to S177. If the two items of the second identification information are not the same, the identification information decision section 215 requests the user to re-input the second identification information. Then, the identification information decision section 215 again compares the pre-registered second identification information read from the identification information data base 213 with the second identification information re-inputted by the user. If the user refuses to re-input the second identification information, then it is determined that the command received at S171 was cancelled.

S147: The identification information decision section 215 notifies the setting-administration section 208 of the command received at S171. This completes the description of the fourth embodiment.

The aforementioned advantages can also be obtained when the host apparatus 300 has a smaller number of characters (digits) of identification information (e.g., password) than the printer 310.

There may be many cases in which the host apparatus 300 administrates a plurality of printers 310. In such cases, the printers 310 needs authentication every time the settings of the printer 310 and its options are referenced to and changed, or the status of the printer 310 and its options is checked. Therefore, the authentication is activated more frequently and it is often that complex identification information (e.g., password) is not used. Therefore, it is practical to design the system in such a way that the train of characters of the first identification information for the host apparatus 300 contains a smaller number of characters than the second identification information for the printer 310.

Fifth Embodiment

The configuration of a host apparatus 300 according to a fifth embodiment is the same as the second embodiment.

Figure 19:
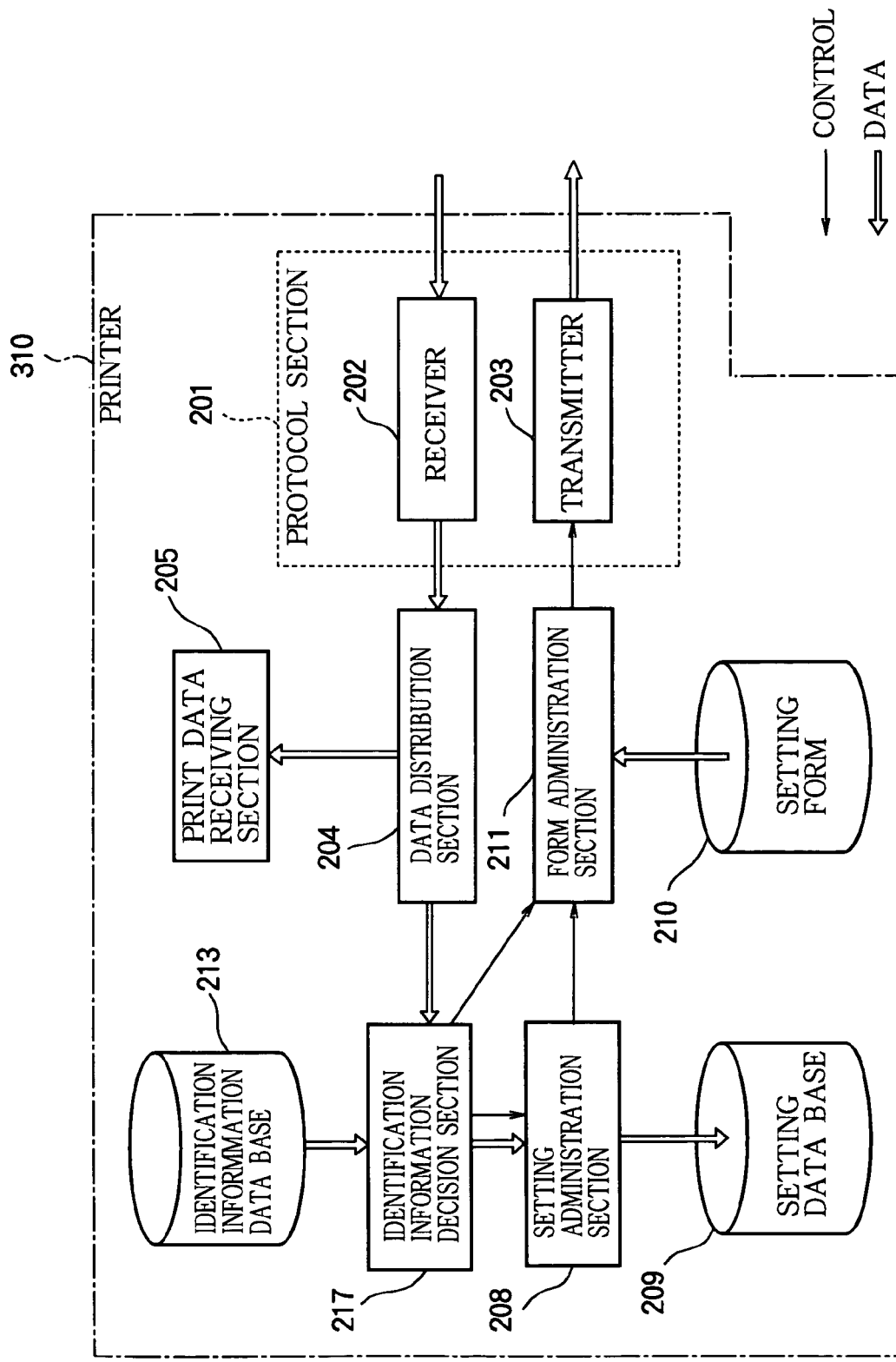
FIG. 19 is a block diagram of a printer according to a fifth embodiment.

FIG. 19 is a block diagram of a printer 310 according to the fifth embodiment.

The configuration of the fifth embodiment will be described with reference to FIG. 19. The operations of from a protocol section 201 to a print data receiving section 205 in the fifth embodiment are the same as those in the first embodiment.

The fifth embodiment uses an identification information decision section 217 in place of the identification information decision section 206 in the first embodiment.

The identification information decision section 217 determines whether a command was inputted by an authorized person (hereinafter network administrator), the command being supplied from the data distribution section 204 and requesting to reference to or change the settings of the printer 310 and its options or to check the status of the printer 310 and its options.

If the received information contains the first identification information indicative of a network administrator, then the identification information decision section 217 determines whether the first identification information is valid or invalid. If it is valid, then the identification information decision section 217 notifies the setting-administration section 208 of the command for referencing to or changing the settings of the printer and its options or for checking the status of the printer and its options.

If the first identification information is invalid or the received information does not contain the first identification information, then it is determined that the first authentication in the first authentication section 118 of the host apparatus 300 has not been passed successfully. Then, through the form administration section 211, the identification information decision section 217 requests the host apparatus 300 of the second identification information indicative of a network administrator.

The second identification information is used when an authentication function (referred to as second authentication) is performed in the printer 310. The second authentication is activated when the user accesses the WEB page in the printer 310 directly from the host apparatus 300.

When the identification information decision section 217 notifies the setting-administration section 208 and the form administration section 211, the identification information decision section 217 also notifies these sections of a means that received the information or at least information indicative of which means received the information.

The received first identification information is determined as follows:

The identification information decision section 217 reads the first identification information from the identification information data base 216. Then, the identification information decision section 217 compares the first identification information received via a receiving means with the second identification information read from the identification information data base 216.

If the two items of information coincide, then it is determined that the received first identification information is valid. If the two items of information do not coincide, it is determined that the received first identification information is invalid.

An identification information data base 216 is a data base that holds the pre-registered first identification information and the pre-registered second identification information.

In the fifth embodiment, the first identification held in the identification information data base 216 can be rewritten by means of conventional MIB and WEB. The WEB page for rewriting the first identification information held in the identification information data base 216 is stored in the setting form 210.

MIB is a data base that allows information exchange in a text format called asn.1. In order to access the respective items on MIB, a protocol called SNMP is used to specify identifiers called ObjectID assigned to the respective items.

The setting administration section 208, setting data base 209, setting form 210, and form administration section 211 in the fifth embodiment have the same configuration as those in the first embodiment.

The outline of the fifth embodiment will be described with reference to FIG. 3. In order that the user can use the utilities 301 on the host apparatus 300, it is necessary to first perform authentication (referred to as first authentication) of the user. This authentication (first authentication) is carried out in such a way that the user inputs information indicative of a network administrator (first identification information) into the host apparatus 300.

Here, information indicative of a network administrator refers to, for example, a user ID, an account name, and a password. Thereafter, if the user activates a function that is absent in the utilities 301 but displayed on the screen, the host apparatus 300 reads the WEB page 311 of the printer 310.

In the fifth embodiment, at this moment, the host apparatus 300 notifies the printer 310 of the first identification information inputted by the user previously.

The identification information decision section 217 compares the first identification information pre-registered in the printer 310 with the first identification information received from the host apparatus 300. If they are the same, then it is determined that the first authentication has been passed successfully.

Thus, the printer 310 implements the command without activating an authentication function installed in the printer 310, i.e., second authentication, thereby allowing the host apparatus 300 to read the WEB page 311.

In the fifth embodiment, a "first setting means" is a function of the utility 301 that, for example, references to and changes the settings of the printer 310 and its options and checks the status of the printer 310 and its options.

A "second setting means" is a function that references to and changes the settings of the printer 310 and its options and checks the status of the printer 310 and its options, the second setting means being activated via the WEB page 311. The first setting means may be configured in such a way a way that the first setting means (utilities 301) has only a function that references to the settings in the printer 310, and the second setting means takes care of changing of the settings via the WEB browser 115.

The operation of the host apparatus 300 in the fifth embodiment is the same as that in the second embodiment.

The operation of the printer 310 is the same as the first embodiment except for the following.

If the command received from the host apparatus 300 is to reference to or change the settings of the printer and its options or to check the status of the printer 310 and its options, the received command is sent to the identification information decision section 217 via the receiver 202 and the data distribution section 204.

Figure 20:
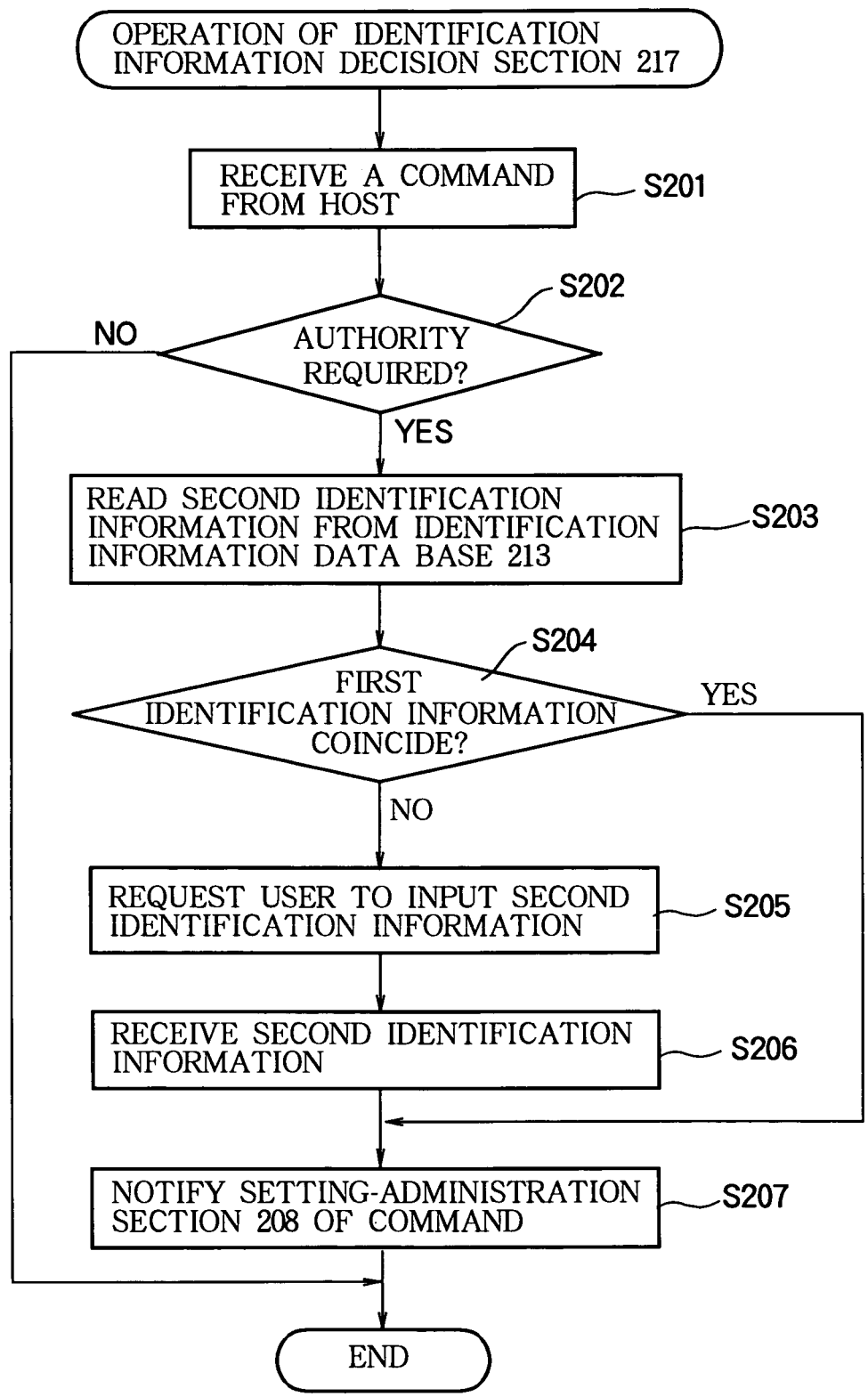
FIG. 20 is a flowchart illustrating the operation of an identification information decision section according to the fifth embodiment.

FIG. 20 is a flowchart illustrating the operation of the identification information decision section 217 according to the fifth embodiment. The operation of the identification information decision section 217 will be described in detail with reference to FIG. 20.

S201: The printer 310 receives a command from the host apparatus 300.

S202: A check is made to determine whether the received command requires authentication. The identification information decision section 217 knows commands that require authentication.

If the command requires authentication, the program proceeds to S203. If the command does not require authentication, the program ends.

S203: The identification information decision section 217 reads the pre-registered second identification information from the identification information data base 216.

S204: The identification information decision section 217 compares the pre-registered first identification information read from the identification information data base 216 at S203 with the first identification information received from the host apparatus 300.

If the two items of the first identification information are the same, then it is determined that the first authentication has been passed successfully. Therefore, the second authentication in the printer 310, which has the same authentication level as the first authentication, is not activated.

Thus, the program proceeds to S207. If the first identification information has not been received from the host apparatus 300 or the two items of the first identification information are not the same, then it is determined that the first authentication has not been passed successfully, and the program proceeds to S205.

S205: The second authentication function is activated, thereby requesting the user to input the second identification information through the means via which the command was received. For example, if the command is received via the WEB (protocol is http), then the second identification information is requested via the WEB.

S206: The printer 310 receives the second identification information from the user. The identification information decision section 217 reads the pre-registered second identification information from the identification information data base 216. Then, the identification information decision section 217 compares the pre-registered second identification information read from the identification information data base 216 with the second identification information received from the user.

If the two items of the second identification information are the same, then the program proceeds to S207.

If the two items of the second identification information are not the same, the identification information decision section 217 requests the user to re-input the second identification information. Then, the identification information decision section 217 again compares the pre-registered second identification information read from the identification information data base 216 with the re-inputted second identification information.

If the user refuses to re-input the second identification information, then it is determined that the command received at S171 was cancelled.

S207: The identification information decision section 217 notifies the setting-administration section 208 of the command received at S201. This completes the description of the fifth embodiment.

The aforementioned advantages can also be obtained when the host apparatus 300 and the printer 310 differ in identification information (e.g., password).

There may be many cases in which the host apparatus 300 administrates a plurality of printers 310, in which case, the printers 310 may be administered by individual authorized persons and the overall administration of the printers 310 is performed by a separate department. Thus, the individual printers 310 may well be assigned different identification information (e.g. password). Also, it may be necessary to ensure security by assigning different identification information to individual printers. Thus, the configuration of the fifth embodiment is practical.

Sixth Embodiment

Figure 21:
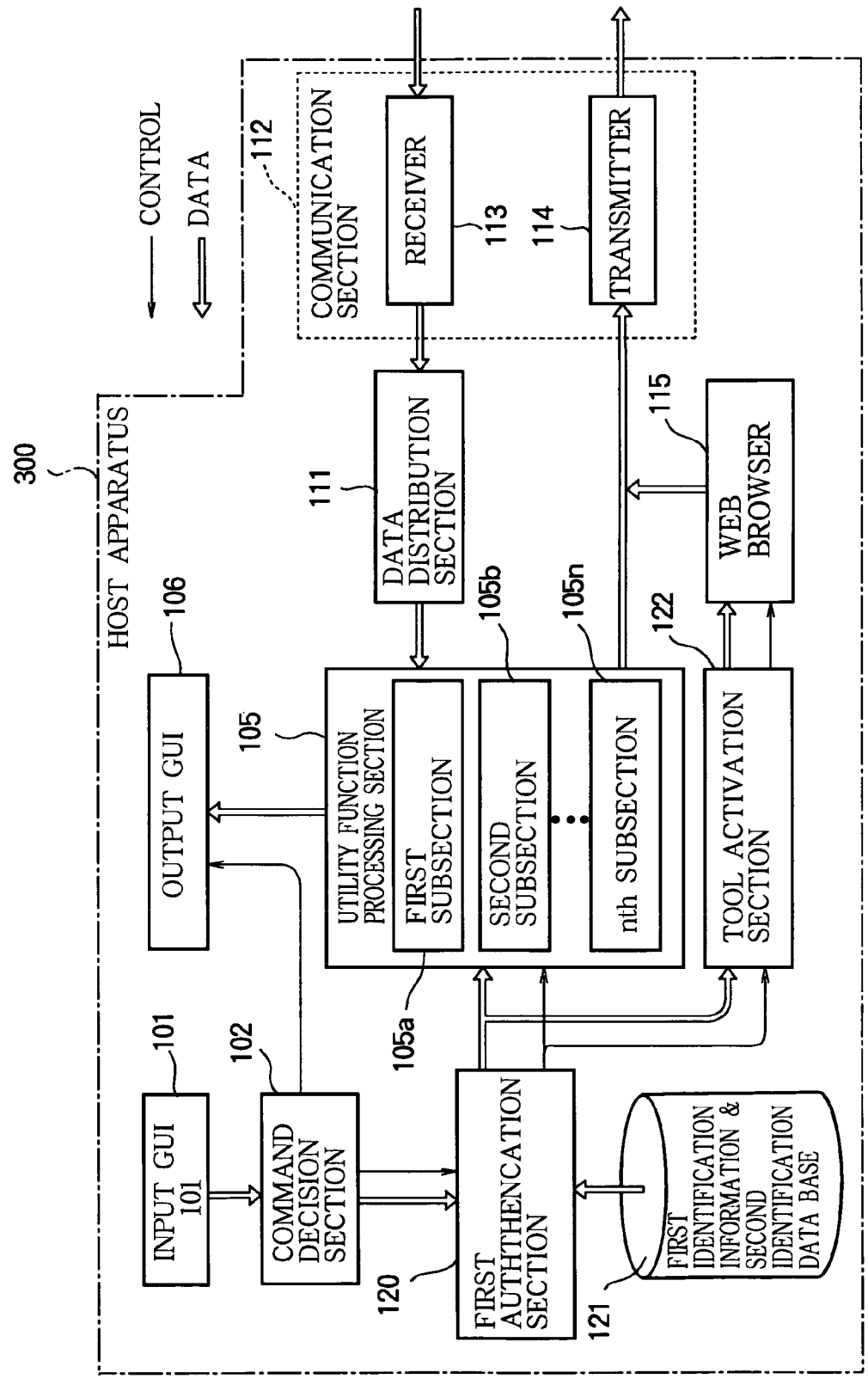
FIG. 21 is a block diagram illustrating a host apparatus according to a sixth embodiment.

FIG. 21 is a block diagram illustrating a host apparatus 300 according to a sixth embodiment. The configuration of the sixth embodiment will be described with reference to FIG. 21.

The input GUI 101 receives information from the user. The input information includes a command from the user and identification information indicative of the user. The identification information of a user is information that identifies the user. The identification information takes the form of, for example, a password and user ID (account). The identification information of a user in the host apparatus 300 is first identification information.

A command decision section 102 receives the information inputted by the user through the input GUI 101 and reads a command to the host apparatus 300. The command decision section 102 then selects an appropriate one of subsections in a utility function processing section 105. Some commands require authentication. If such a command is received, then the command decision section 102 requests through an output GUI section 116 the user to input identification information that identifies the user, i.e., the first identification information.

If the information inputted by the user through the input GUI 101 contains the first identification information, the command decision section 102 will not request the user to input the identification information that identifies the user through the output GUI section 116. The command decision section 102 sends the command contained in the received information to a first authentication section 120 while also notifying the first authentication section 120 of a subsection corresponding to the command in the utility function processing section 105.

A first-and-second identification information data base 121 is a data base that holds pre-registered first identification information for the printer 310. The first authentication section 120 compares the pre-registered first identification information received from the command decision section 102 with the first identification information read from the first-and-second identification information data base 121 to produce first authentication information. This operation is called first authentication. If the two items of first identification information coincide, the first authentication section 120 sends the command received from the command decision section 102 and the comparison result to the corresponding subsection in the utility function processing section 105. If a WEB browser 115 is to be activated, the command decision section 102 specifies a tool activation section 122 that activates a tool in a printer.

At this moment, the first authentication section 120 reads the second identification information for the printer 310 from the first-and-second identification information data base 121, and the command decision section 102 notifies an appropriate subsection in the utility function processing section 105 of the second identification information.

The utility function processing section 105 includes n different functions; a first subsection 105a, a second subsection 105b, . . . . and an n-th subsection 105n. The utility function processing section 105 transmits information to the printer 310 via a transmitter 114 and receives information from the printer 310 via a receiver 113 and a received data decoder 111.

A tool activation section 122 operates to activate functions that are not available in the host apparatus 300. By way of example, the sixth embodiment will be described in terms of an operation that activates a WEB page 311 (FIG. 3) installed in the printer 310.

The tool activation section 122 activates the WEB browser 115 by sending the address and the second identification information to the WEB browser 115, the address indicating a specific WEB page installed in the printer 310 and the second identification information being received from the first authentication section 120.

During the communication with the printer 310 to activate a function in the utility function processing section 105, the received data decision section 111 checks the content of the data received from the printer 310 and then directs the data to a corresponding subsection in the utility function processing section 105.

A communication section 112 is a communication processing section through which the respective sections in the host apparatus 300 communicate with external apparatus connected to the host apparatus.

In the sixth embodiment, the communication section 112 takes the form of a network interface. The respective sections in the host apparatus 300 receive information through the receiver 113 from external apparatus and send information through the transmitter 114 to external apparatus.

The WEB browser 115 is a common WEB browser that may be activated when a tool activation section 122 communicates with an external apparatus. The WEB browser 115 reads a WEB page according to an address received by the tool activation section 122.

Through the output GUI section 116, the host apparatus 300 displays information to the user as well as requests the user to input the first identification information.

This completes the description of the host apparatus 300 according to the sixth embodiment.

Figure 22:
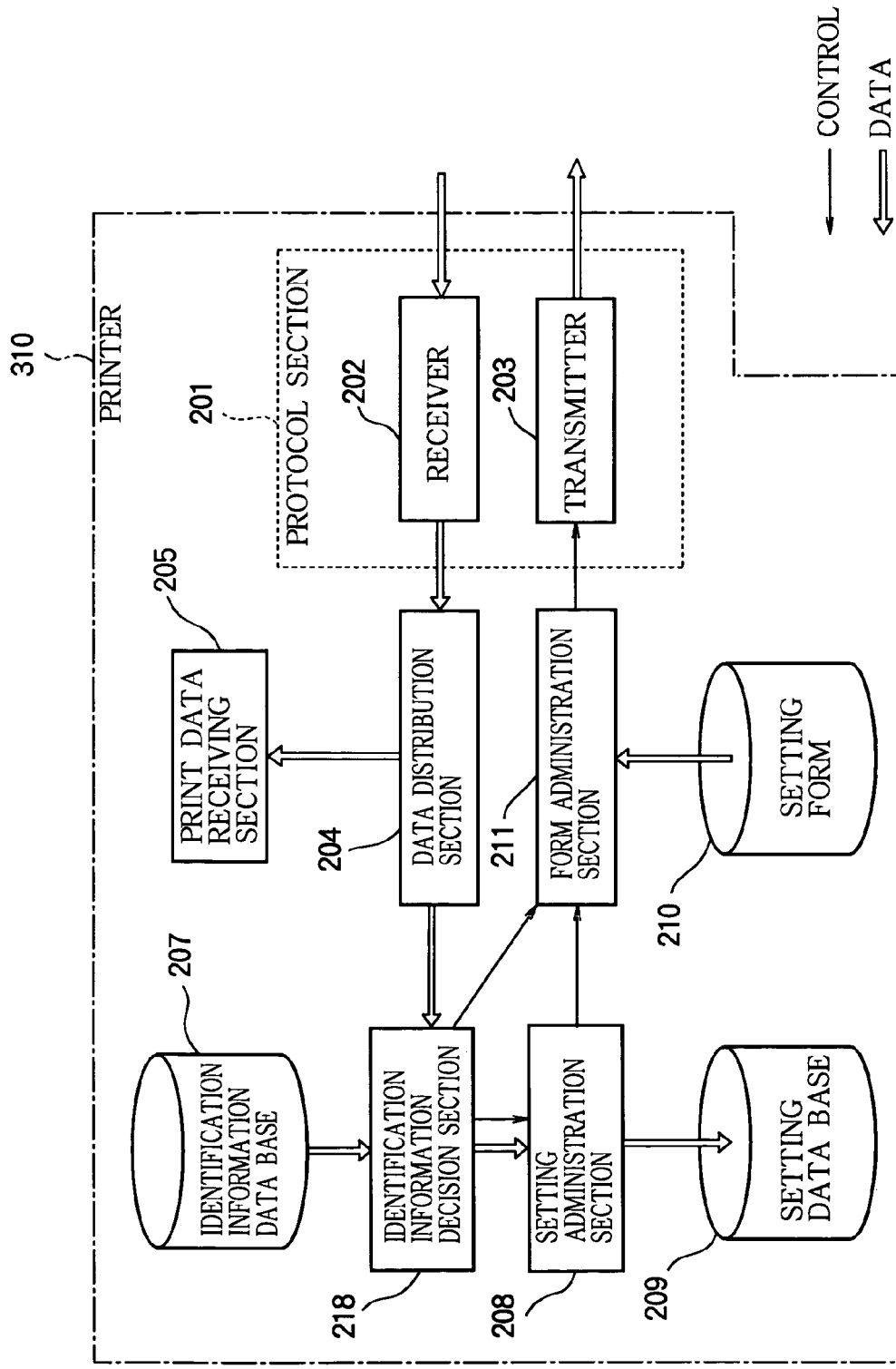
FIG. 22 is a block diagram of a printer according to the sixth embodiment.

FIG. 22 is a block diagram of the printer 310 according to the sixth embodiment.

The operations of from a protocol section 210 to a print data receiving section 205 in the sixth embodiment are the same as those in the first embodiment.

The sixth embodiment uses an identification information decision section 218 in place of the identification information decision section 206.

The identification information decision section 218 determines whether a command was inputted by an authorized person (hereinafter network administrator), the command being supplied from the data distribution section 204.

If the received information contains the second identification information indicative of a network administrator, then the identification information decision section 218 determines whether the second identification information is valid or invalid. If it is valid, then the identification information decision section 218 notifies the setting-administration section 208 of the command.

If the second identification information is invalid or the received command does not contain the second identification information indicative of a network administrator, then the identification information decision section 218 requests the user of the second identification information indicative of a network administrator via a form administration section section 211.

The second identification information is used when an authentication function (referred to as second authentication) is performed in the printer 310. The second authentication is activated when the user accesses the WEB page in the printer 310 directly from the host apparatus 300.

When the identification information decision section 218 notifies the setting administration section 208 and the form administration section 211, the identification information decision section 218 also notifies these sections of a means that received the command or at least information indicative of which means received the command.

The second identification information is determined as follows:

The identification information decision section 218 reads the second identification information from an identification information data base 207. Then, the identification information decision section 218 compares the received second identification information with the second identification information read from the identification information data base 207.

If the two items of second identification information are the same, then it is determined that the received second identification information is valid. If the two items of information are not the same, it is determined that the received second identification information is invalid.

The identification information data base 207, the setting-administration section 208, a setting data base 209, the setting form 210, and the setting form administration section 211 are of the same configuration as the first embodiment.

In order that the user can use the utilities 301 on the host apparatus 300, it is necessary to first perform authentication of the user.

This authentication is carried out in such a way that the user inputs information indicative of a network administrator (first identification information) into the host apparatus 300.

Here, identification information indicative of a network administrator refers to, for example, a user ID, an account name, and a password. Thereafter, If the user activates a function absent from the utilities 301 but displayed on the screen, the host apparatus 300 reads the WEB page 311 of the printer 310.

In the sixth embodiment, the host apparatus 300 notifies the printer 310 of the identification information identifying an authorized person.

Thus, the printer 310 implements the request without activating an authentication function installed in the printer 310, i.e., the second authentication, thereby allowing the host apparatus 300 to read the WEB page 311.

In the sixth embodiment, a "first setting means" is a function of the utility 301 that, for example, references to and changes the settings of the printer 310 and its options and checks the status of the printer 310 and its options.

A "second setting means" is a function that references to and changes the settings of the printer 310 and its options and checks the status of the printer 310 and its options, the second setting means being activated via the WEB page 311.

The first setting means may be configured in such a way that the first setting means (utilities 301) has only a function that references to the settings in the printer 310, and the second setting means takes care of changing of the settings via the WEB browser 115.

Figure 23:
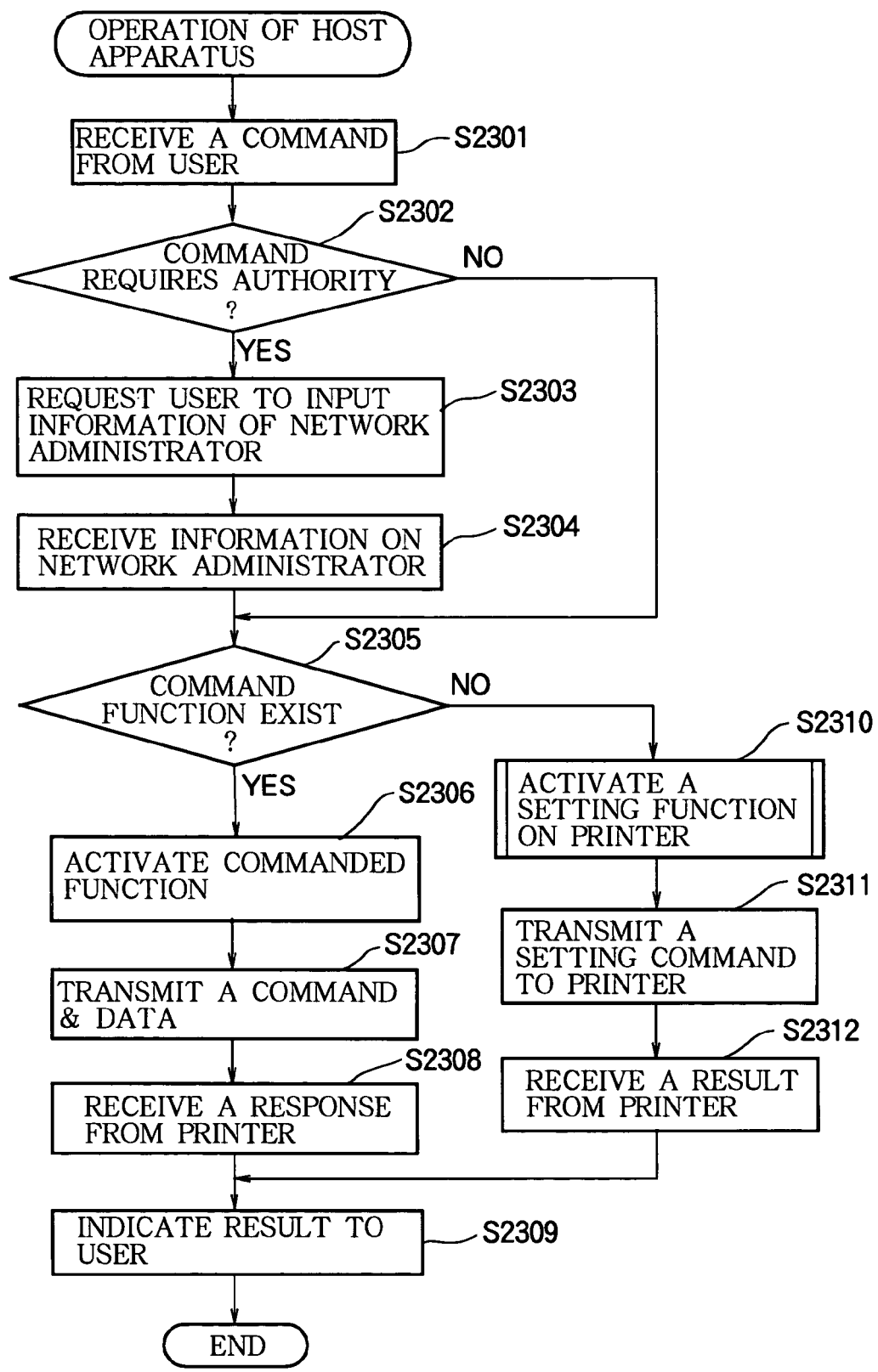
FIG. 23 is a flowchart illustrating the operation of the host apparatus of FIG. 21.

FIG. 23 is a flowchart illustrating the operation of the host apparatus 300. The operation of the host apparatus 300 will be described with reference to FIG. 23.

S2301: The host apparatus 300 receives a command from a user of the utilities provided in the respective operating systems. The user can send various commands to the printer 310 by using a mouse to click a button on the utilities 301 (FIG. 3) or select an appropriate one from a pull-down menu. The command is received via the input GUI section 101 and then transferred to the command decision section 102.

S2302: The command decision section 102 checks the command received at S401 from the user to determine whether the command may be made only by an authorized network administrator or by any user. Commands that require authorization and commands that do not require authorization have been registered in advance.

If a command needs to be attended by authentication, the program proceeds to S2303; if the command need not be attended by authentication, the program proceeds to S2305.

S2303: The utility 301 on the host apparatus 300 requests the user to input pre-registered identification information indicative of a network administrator (first identification information). An input screen will appear, prompting the user to input, for example, a password.

S2304: When the user inputs, for example, a password, the utility 301 accepts the password as the first identification information.

S2305: When authentication for the command received has completed, a decision is made to determine whether the function requested by the user exists in the utilities 301. If the function commanded by the user exists in the utilities 301, then the program proceeds to S2306; if not, the program proceeds to S2310.

S2306: In order to activate a function requested by the user, a corresponding subsection (the second subsection 105b is assumed here) in the utility function processing section 105 is activated.

Assume that the user requests to switch a standby time from "30 minutes" to "5 minutes", the standby time being a time length that should be allowed before the printer enters an energy saving mode after the printer has completed a printing job. The command decision section 102 knows which one of the subsections (assume subsection 105b) is assigned an operation for switching the printer from the normal mode to the energy saving mode. Thus, the command decision section 102 specifies the second subsection 105b.

S2307: The second subsection 105b knows which identifier is assigned to the standby time. Thus, the second subsection 105b sends an identifier indicative of the standby time and a time length of "5 minutes" to the printer 310 via the transmitter 114. The identifier is used to uniquely identify a corresponding data item. If MIB is to be used, the identifier is Object ID.

S2308: The host apparatus receives a response from the printer 310.

The response indicates whether a standby time of 5 minute has been set successfully. The received data decoder 111 directs the response from the printer 310, received via the receiver 113, to a section that originally sent the command. In this case, the command was originally sent from the second subsection 105b. Therefore, the received data decoder 111 directs the response received from the printer 310 to the second subsection 105b.

S2309: The response is indicated to the user via the output GUI section 116.

S2310: If it is determined that the function commanded by the user at S2305 is not resident in the utility 301, then the tool activation section 110 causes the WEB browser 115 to call the WEB page 311 from the printer 310. This processing will be described later in detail.

In the sixth embodiment, when the first authentication section 120 activates the tool activation section 122, the first authentication section 120 reads the second identification information from the first-and-second identification information data base 121.

FIG. 26 illustrates the configuration of the fist-and-second identification information data base 121.

Identifiers (e.g., IP address) that identify apparatus may be stored in a table previously. Then, the identifier may be used as a key to retrieve a corresponding apparatus and the second identification information for the apparatus. Once an apparatus is identified in the table, then the second identification information for the apparatus can be identified in the same row of the table. The detailed operation (S2310) of the tool activation section 122 will be described later (FIG. 24).

S2311: The WEB page 311 called from the printer 310 runs on the WEB browser 115 in the host apparatus 300 and sets the standby time of 5 minutes into the printer 310. This operation of setting the standby time is carried out by the use of PUT command of HTTP. Generally speaking, a WEB page is a sort of program and therefore runs on a CPU in the host apparatus 300. This is true for the WEB according to the sixth embodiment.

S2312: The WEB page 311 called from the printer 310 and runs on the WEB browser 115 receives from the printer 310 a response indicating that the standby time has been set to "5 minutes."

Figure 24:
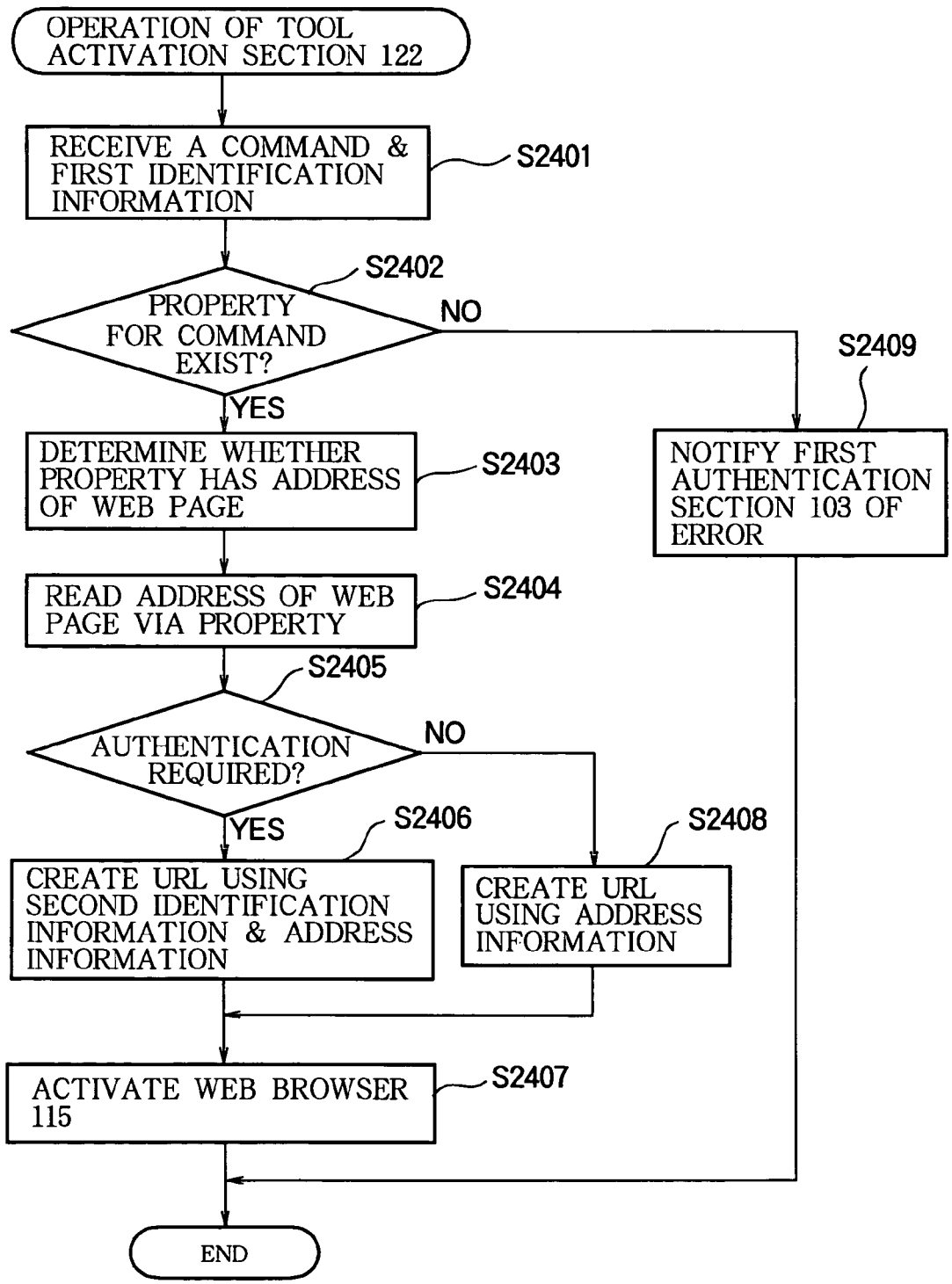
FIG. 24 is a flowchart illustrating the operation at step S2310 in FIG. 23.

FIG. 24 is a flowchart illustrating the operation at S2310 in FIG. 23, i.e., the operation of calling the WEB page 311 via the WEB browser 115.

The operation is carried out by the tool activation section 110. The operation will be described in detail with reference to FIG. 24.

S2401: The tool activation section 122 receives the command from the user and the first identification information from the first authentication section 120.

S2402: A check is made to determine whether a property corresponding to the command exists, thereby determining whether a WEB page corresponding to the command exists. Property will be described in S2403.

If it is determined that an address for the WEB page corresponding to the command exists, the program proceeds to S2403. If an address for the WEB page corresponding to the command does not exist, the program proceeds to S2409.

S2403: In order to read the WEB page 311 that corresponds to the command, the tool activation section 122 needs to know the address of the WEB page 311. For this purpose, a check is made to determine whether the property corresponding to the command has the address of the WEB page 311. FIG. 8 is a table stored in the tool activation section 110, the table listing properties and corresponding commands. The tool activation section 110 uses a command as a key to retrieve a corresponding address from the properties.

S2404: An address for the WEB page to be accessed is read from the properties.

S2405: A check is made to determine whether authentication is required for calling the WEB page 311 to be accessed. If the WEB page 311 requires authentication, the program proceeds to S2406. If the WEB page 311 does not require authentication, the program proceeds to S2408.

S2406: By using the address read at S2403 and the second identification information received at S2401, a URL is created and passed to the WEB browser 115. URL stands for Universal Resource Locator and is the location of a WEB page. Here, the term URL is used to reference to address information described in the format that the WEB browser 115 can be connected properly.

Combining the address information and the second identification information, a URL is created as follows:

The protocol for the URL is http:// for the following:
(1) Address of printer 310: 10.20.30.40
(2) Name of file to be called: /Printer/energy/energy.html
(3) Authentication: a-XXXXX and b=YYYYY Following http://, the address to which the host apparatus is to be connected is described and then common.cgi which is the name of the operating program of the printer is described.

The remaining part follows "?," which is an argument description for the operating program common.cgi.

http://10.20.30.40/
common.cgi?name=AAAA&pass=YYYY&filename=/
Printer/energy/energy.html Therefore, the entire URL is as follows:

http://10.20.30.40/
common.cgi?name=AAAA&pass=YYYY&filename=/
Printer/energy/energy.html The common.cgi receives the second identification information: name=AAAA and pass=YYYY. This part is preferably in encryption form. Then, the name of file is received. The common.cgi notifies the identification information decision section 218 of the second identification information. The common.cgi transfers the specified WEB page, i.e., filename=Printer/energy/energy.html to the host apparatus 300, so that the WEB browser 115 on the host apparatus 300 can read the WEB page, i.e., Printer/energy/energy.html.

S2407: The tool activation section 122 notifies the WEB browser 115 of the thus created URL.

Then, the WEB browser 115 accesses the notified URL to call the desired WEB page 311.

S2408: If an authentication is not required for calling the WEB page 311, the URL is created by using the address information only.

S2409: If there does not exist a property corresponding to the command inputted by the user, error is notified to the command decision section 102 via the authentication section 103. This step completes the description of the operation of the host apparatus 300.

The operation of the printer 310 is the same as the first embodiment except for the following.

If the command received from the host apparatus 300 is to reference to or change the settings of the setting form 210 and its options or to check the settings of the setting form 210 and its options, the command is directed via the receiver 202 and the data distribution section 204 to the identification information decision section 218.

Figure 25:
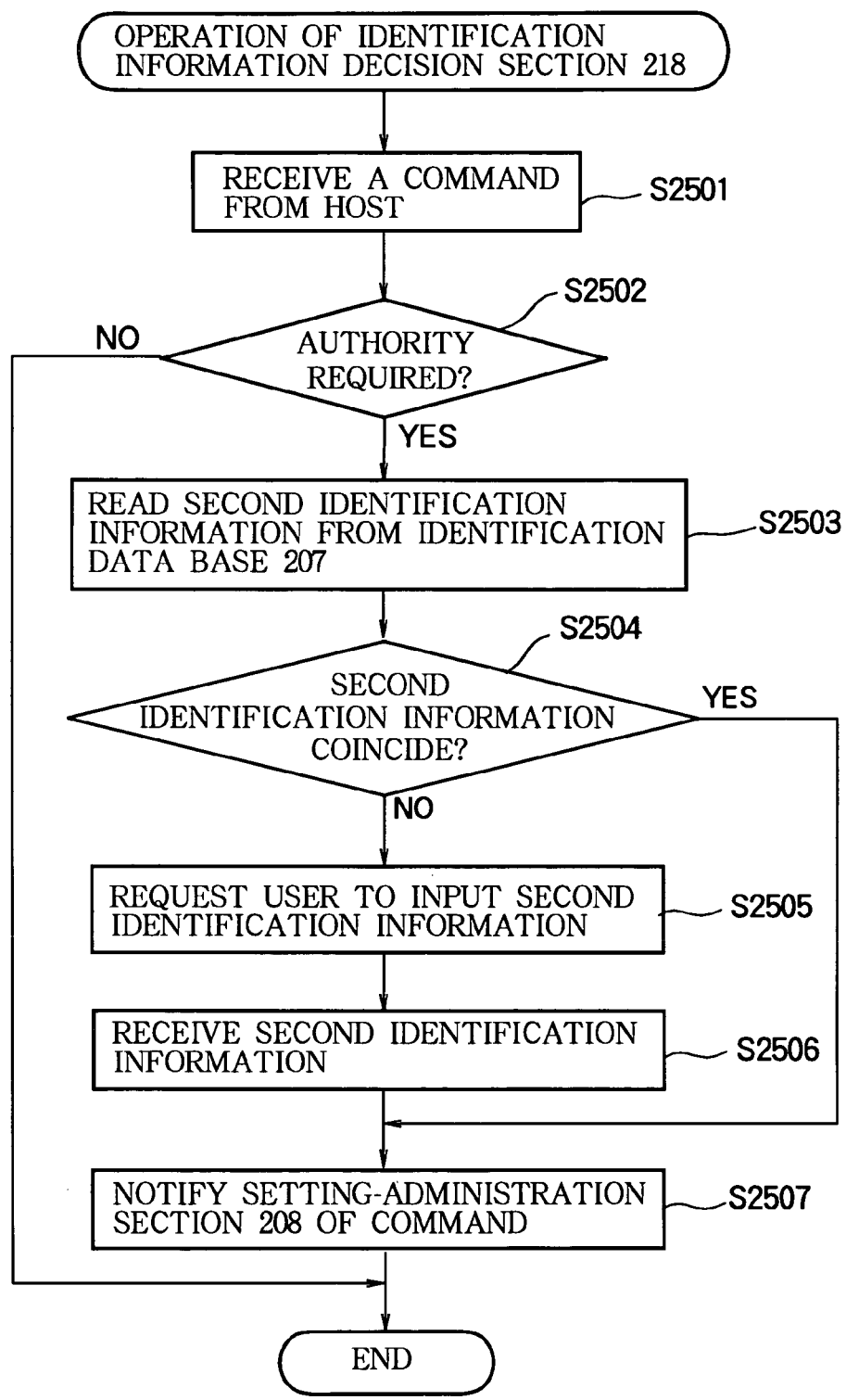
FIG. 25 is a flowchart illustrating the operation of an identification information decision section according to the sixth embodiment.

FIG. 25 is a flowchart illustrating the operation of the identification information decision section 218 according to the sixth embodiment. The operation of the identification information decision section 218 will be described in detail with reference to FIG. 25.

S2501: The printer 310 receives a command from the host apparatus 300.

S2502: A check is made to determine whether the received command requires authentication. The identification information decision section 218 knows commands that require authentication. If the command requires authentication, the program proceeds to S2503. If the command does not require authentication, the program ends.

S2503: The identification information decision section 218 reads the pre-registered second identification information from the identification information data base 207.

S2504: The identification information decision section 218 compares the pre-registered second identification information read from the identification information data base 207 at S2503 with the second identification information received from the host apparatus 300.

If the second identification information has been received from the host apparatus 300 and is the same as the second identification information read from the identification information data base 207, then it is determined that the first authentication in the host apparatus 300 has been passed successfully. Therefore, the second authentication in the printer 310, which has the same authentication level as the first authentication, is not activated.

Then, the program proceeds to S2507. If the second identification information has not been received from the host apparatus 300, it is determined that the first authentication in the host apparatus 300 has not been passed successfully. Thus, the program proceeds to S2505.

S2505: The identification information decision section 218 activates the second authentication to request the user to input the second identification information, the request being transmitted via a means that received the command from the host apparatus at S2501. For example, if the command is received via the WEB (protocol is http), then the second identification information is requested via the WEB.

S2506: The printer 310 receives the second identification information from the host apparatus 300 via the WEB.

Then, the identification information decision section 218 reads the second identification information from the identification information data base 207 and compares the second identification information received from the host apparatus 300 with the second identification information read from the identification information data base 207. This is the second authentication.

If the two items of the second identification information coincide, the program proceeds to S2507. If the two items of the second identification information do not coincide, then the identification information decision section 218 prompts the user to re-input the second identification information. Then, the identification information decision section 218 compares the second identification information read from the identification information data base 207 with the re-input second identification information.

If the user refuses to re-input the second identification information, it is determined that the command received at S2501 was canceled.

S2507: The identification information decision section 218 notifies the setting-administration section 208 of the command received at S2501. This completes the description of the sixth embodiment.

A plurality of printers 310 under administration of the host apparatus 300 can be assigned different identification information (e.g. password). This prevents security among the printers 310 from decreasing more than necessary.

The host apparatus 300 may administrates a plurality of printers 310, in which case, the printers 310 may be administered by individual authorized persons and the overall administration of the printers 310 is performed by a separate department. Thus, the individual printer 310 may well be assigned different identification information (e.g. password).

Also, it may be necessary to ensure security by assigning different identification information to individual printers. Thus, the configuration of the sixth embodiment is practical.

The printer 310 does not need a storage area that stores the first identification information of the host apparatus 300, as opposed to the fifth embodiment.

The printers 310 can be administered on the host apparatus 300 side without having to register the first identification information of the host apparatus 300.

While the first to sixth embodiments have been described with respect to a case in which functions not available in the utilities of the host apparatus 300 are implemented by means of a WEB page on the printer, the present invention may be applicable to systems such as FAX, MFP, and complex apparatus in which a WEB page is used to implement functions not available in the utility of these apparatus.

What is claimed is:

1. A printing system having a host apparatus and a printer connected to the host apparatus,
   wherein the host apparatus comprises:
   an inputting section through which a user inputs first identification information and a command having either a first function or a second function;
   an authentication section that performs an authentication operation based on the first identification information inputted by the user to generate authentication information indicative of whether the user is an authorized person;
   a first transmitting and receiving section through which the host apparatus communicates with the printer;
   a utility function processing section that runs on the host apparatus and allows activation of the first function of the printer via said first transmitting and receiving section; and
   a controller;
   wherein the printer comprises;
   a second transmitting and receiving section through which the printer communicates with the host apparatus, said second transmitting and receiving section enabling communication between the printer and the host apparatus;
   an administration section that is activated by said controller and runs on the printer, said administration section allowing activation of the second function of the printer via said second transmitting and receiving section; and
   an identification information decision section that determines based on the authentication information whether the command is allowed to be activated.

2. The printing system according to claim 1, wherein when the user inputs the command to activate said administration section after the authentication operation, said controller sends the second function and the authentication information to the printer via said first transmitting and receiving section;
   wherein said identification information decision section determines based on the authentication information whether the command is allowed to be activated;
   wherein if the authentication information is valid, said controller activates said administration section.

3. The printing system according to claim 1, wherein when the user inputs the command to activate said administration section before the authentication operation, said identification information decision section sends a response requesting the host apparatus of second identification information for authenticating the user;
   wherein said controller transmits the second identification information to the printer in response to the response;
   wherein said identification information decision section determines based on the second identification information received from said controller whether the second function is allowed to be activated;

wherein if said identification information decision section determines that the authentication is valid, said controller activates said administration section.

4. The printing system according to claim 1, wherein the printer further comprises an identification information data base that holds pre-registered identification information representative of an authorized user;

wherein if the command contains a second function, said identification information decision section determines that the authentication information is invalid, and requests the host apparatus of second identification information for authenticating the user;

wherein when the second identification information is received from the host apparatus, said identification information decision section compares the pre-registered identification information with the second identification information received from the host apparatus to determine whether the command is allowed to be activated;

wherein when the pre-registered identification information is the same as the second identification information, said controller activates the administration section.

5. A printing system having a host apparatus and a printer connected to the host apparatus, wherein the host apparatus comprises:

an inputting section through which a user inputs first identification information and a command including either a first function or a second function;

an authentication section that performs an authentication operation based on the first identification information inputted by the user to generate authentication information indicative of whether the user is an authorized person;

a first transmitting and receiving section through which the host apparatus communicates with the printer;

a utility function processing section that runs on the host apparatus and allows activation of the first function of the printer via said first transmitting and receiving section; and a controller;

wherein the printer comprises:

a second transmitting and receiving section through which the printer communicates with the host apparatus;

an administration section that is activated by said controller and runs on the printer, said administration section allowing activation of the second function of the printer via said second transmitting and receiving section; and an identification information decision section that compares the first identification information received from the host apparatus via said first transmitting and receiving section with a second identification information held in the printer to determine whether the command is allowed to be activated.

6. The printing system according to claim 5, wherein when the user inputs the command to activate said administration section after the authentication operation, said controller sends the second function and the authentication information to the printer via said first transmitting and receiving section;

wherein said identification information decision section determines based on the authentication information whether the command is allowed to be activated;

wherein if the authentication information is valid, said controller activates said means administration section.

7. The printing system according to claim 5, wherein the user inputs the command to activate said administration section before the authentication operation, said identification information decision section sends a response requesting the host apparatus of second identification information for authenticating the user;

wherein said controller transmits the second identification information to the printer in response to the response;

wherein said identification information decision section determines based on the second identification information received from said controller whether the second function is allowed to be activated;

wherein if said identification information decision section determines that the authentication is valid, said controller activates said administration section.

8. The printing system according to claim 5, wherein the printer further comprises an identification information data base that holds the pre-registered second identification information;

wherein if said identification information decision section determines that the first identification information received from the host apparatus is the same as the second identification information read from said identification data base, said controller activates said administration section.

9. The printing system according to claim 5, wherein the printer further comprises an identification information data base that holds the pre-registered second identification information;

wherein if said identification information decision section determines that the first identification information contains the second identification information, said controller activates said administration section.

10. The printing system according to claim 5, wherein the printer further comprises an identification information data base that holds the pre-registered second identification information;

wherein if said identification information decision section determines that the first identification information is contained in the second identification information, said controller activates said administration section.

11. A printing system having a host apparatus and a printer connected to the host apparatus, wherein the host apparatus comprises:

an inputting section through which a user inputs first identification information and a command including either a first function or a second function;

an authentication section that performs an authentication operation based on the first identification information inputted by the user to generate authentication information indicative of whether the user is an authorized person;

a first transmitting and receiving section through which the host apparatus communicates with the printer;

a utility function processincj section that runs on the host apparatus and allows activation and reference of the first function of the printer via said first transmitting and receiving section; and a controller that transmits the first identification information and the command to the printer via said first transmitting and receiving section;

wherein the printer comprises:

a second transmitting and receiving section through which the printer communicates with the host apparatus;

an administration section that is activated by said controller and runs on the printer, said administration section allowing activation of the second function of the printer via said second transmitting and receiving section;

an identification information data base that holds the pre-registered first identification information indicative of an authorized person; and an identification information decision section that compares the first identification information received from the host apparatus with the first identification information read from said identification information data base to determine whether the command is allowed to be activated.

12. The printing system according to claim 11, wherein when said identification information decision section determines that the first identification information received from the host apparatus coincides the first identification information read from said identification information data base, said controller activates said administration section.

13. A printing system having a host apparatus and a printer connected to the host apparatus, wherein the host apparatus comprises:

an inputting section through which a user inputs first identification information and a command including either a first function or a second function;

an authentication section that performs an authentication operation based on the first identification information inputted by the user to generate authentication information indicative of whether the user is an authorized person;

a first transmitting and receiving section through which the host apparatus communicates with the printer;

a utility function processinci section that runs on the host apparatus and allows activation and reference of the first function of the printer via said first transmitting and receiving section;

a data base that holds a pre-registered second identification information; and a controller;

wherein the printer comprises:

a second transmitting and receiving section through which the printer communicates with the host apparatus;

an identification information data base that holds the pre-registered second identification information indicative of an authorized person;

an identification information decision section that compares the second identification information received from the host apparatus with the second identification information read from said identification information data base to determine whether the command is allowed to be activated;

an administration section that is activated by said controller and runs on the printer, said administration section allowing activation of the second function of the printer via said first transmitting and receiving section and said second transmitting and receiving section.

14. The printing system according to claim 13, wherein the host apparatus further comprises an identification information data base that holds the pre-registered second identification information;

wherein when the user inputs a command to activate said second function after the authentication operation, said controller sends the second identification information held in said identification information data base;

wherein said identification information decision section determines based on the second identification information whether the second function is allowed to be activated;

wherein if the second identification information is valid, said controller activates said administration section.

15. The printing system according to claim 14, wherein when the user inputs a command to activate said administration section before the authentication operation, said identification information decision section sends a response requesting the host apparatus of the second identification information for authenticating the user;

wherein said controller transmits the second identification information to the printer in response to the response;

wherein said identification information decision section determines based on the second identification information received from said controller whether the second function is allowed to be activated; and wherein if said identification information decision section determines based on the second identification information received from said controller that the second identification information is valid, said controller activates said administration section.

16. The printing system according to claim 13, wherein the printer further comprises an identification information data base that holds a pre-registered second identification information indicative of an authorized person;

wherein if the command contains the second function, said identification information decision section determines that the authentication information is invalid, and then requests via the second transmitting and receiving section the host apparatus of the second identification information for authenticating the user;

wherein when the second identification information is received from the host apparatus, said identification information decision section compares the pre-registered identification information with the second identification information received from the host apparatus to determine whether the command is allowed to be executed;

wherein if the pre-registered identification information is the same as the second identification information received from the host apparatus, said controller activates the administration section.

* * * * *